United States Patent
Mathew et al.

(10) Patent No.: US 12,475,003 B2
(45) Date of Patent: Nov. 18, 2025

(54) NAMESPACE RECOVERY FOR KEY-VALUE STORE (KVS)-PERSISTED METADATA

(71) Applicant: Dell Products L.P., Round Rock, TX (US)

(72) Inventors: George Mathew, Belmont, CA (US); Charles Hickey, Aptos, CA (US); Murthy Mamidi, Queen Creek, CA (US)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 18/394,159

(22) Filed: Dec. 22, 2023

(65) Prior Publication Data

US 2025/0208954 A1 Jun. 26, 2025

(51) Int. Cl.
G06F 11/14 (2006.01)
G06F 16/14 (2019.01)

(52) U.S. Cl.
CPC ...... G06F 11/1469 (2013.01); G06F 11/1464 (2013.01); G06F 16/156 (2019.01)

(58) Field of Classification Search
CPC . G06F 11/1469; G06F 11/1464; G06F 16/156
See application file for complete search history.

(56) References Cited

U.S. PATENT DOCUMENTS

| | | | | |
|---|---|---|---|---|
| 10,229,127 B1 * | 3/2019 | Shang | | G06F 12/0833 |
| 11,675,671 B1 * | 6/2023 | Shendge | | G06F 11/1464 |
| | | | | 707/640 |
| 11,977,460 B1 * | 5/2024 | Mathew | | G06F 16/1748 |
| 2014/0330787 A1 * | 11/2014 | Modukuri | | G06F 11/2056 |
| | | | | 707/659 |
| 2016/0210308 A1 * | 7/2016 | Shekhar | | G06F 3/0619 |
| 2019/0146675 A1 * | 5/2019 | Subramanian | | G06F 3/06 |
| | | | | 711/170 |
| 2020/0319978 A1 * | 10/2020 | Smith-Uchida | | G06F 9/45558 |
| 2021/0240584 A1 * | 8/2021 | Pu | | G06F 3/0619 |
| 2021/0342215 A1 * | 11/2021 | Chawla | | G06F 11/079 |
| 2022/0083432 A1 * | 3/2022 | Mondal | | G06F 11/1453 |
| 2024/0256392 A1 * | 8/2024 | Shilane | | G06F 11/1458 |
| 2024/0256485 A1 * | 8/2024 | Shilane | | G06F 16/119 |
| 2024/0354201 A1 * | 10/2024 | Duggal | | G06F 16/1748 |

* cited by examiner

*Primary Examiner* — Kamini B Patel
(74) *Attorney, Agent, or Firm* — Staniford Tomita LLP

(57) ABSTRACT

Page keys are formed in a key-value store (KVS) storing metadata of a filesystem. Page keys identify pages of trees within which namespaces of logical partitions are held. Leaf pages include first and second full keys for each file. First full keys index inodes. Second full keys index filenames. Inode keys are formed in the KVS. Inode keys identify inodes of the files. Metadata is embedded into the page and inode keys such that each page key includes an identifier of a logical partition, an identifier of a snapshot taken of a namespace of the logical partition, and a page number to a page tree holding the namespace. Each inode key includes the logical partition identifier, the snapshot identifier, and an inode number of an inode to a file. Upon damage to the namespace, queries are conducted of the KVS and the namespace is recovered based on the query results.

18 Claims, 18 Drawing Sheets

Form page keys in a KVS storing metadata of a filesystem, the filesystem being partitioned into logical partitions, the page keys identifying pages of trees within which namespaces of the logical partitions are held, the pages including leaf pages including first and second full keys associated with each file of a file set in a logical partition, the first full keys storing inodes for the files in the file set, and the second full keys storing filenames for the files in the file set
910

Form inode keys in the KVS, the inode keys identifying inodes of the files in the file set
915

Embed some of the metadata into the page keys, each page key including an identifier of the logical partition, an identifier of a snapshot taken of a namespace of the logical partition, and a page number to a page in a tree data structure holding the namespace
920

Embed some of the metadata into the inode keys, each inode key including the logical partition identifier, the snapshot identifier, and an inode number of an inode to a file in the file set
925

Determine that recovery operations are needed for the namespace
930

Query the KVS for items needed to recover the namespace
935

Recover the namespace using the items retrieved from the KVS
940

FIG. 9

NAMESPACE RECOVERY FOR KEY-VALUE STORE (KVS)-PERSISTED METADATA

TECHNICAL FIELD

The present invention relates generally to information processing systems, and more particularly to recovering a namespace.

BACKGROUND

The namespace component in a filesystem provides a hierarchical view of named directories, files, and their associated attributes. Namespaces provide a way to organize and manage the naming of files and directories to avoid conflicts and ensure uniqueness. In other words, the namespace maintains metadata of the filesystem such as the names of files, directories, their ownership and creation time, and the location of file data or content.

System crashes, software bugs, and cyberattacks can damage the namespace by corrupting the structures that hold the namespace.

There is a continuing need for improved systems and techniques to recover a namespace that has been damaged.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

Page keys are formed in a key-value store (KVS) storing metadata of a filesystem. Page keys identify pages of trees within which namespaces of logical partitions are held. Leaf pages include first and second full keys for each file. First full keys index inodes. Second full keys index filenames. Inode keys are formed in the KVS. Inode keys identify inodes of the files. Metadata is embedded into the page and inode keys such that each page key includes an identifier of a logical partition, an identifier of a snapshot taken of a namespace of the logical partition, and a page number to a page tree holding the namespace. Each inode key includes the logical partition identifier, the snapshot identifier, and an inode number of an inode to a file. Upon damage to the namespace, queries are conducted of the KVS and the namespace is recovered based on the query results.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 9 shows a flow for namespace recovery, according to one or more embodiments.

DETAILED DESCRIPTION

Figure 1A:
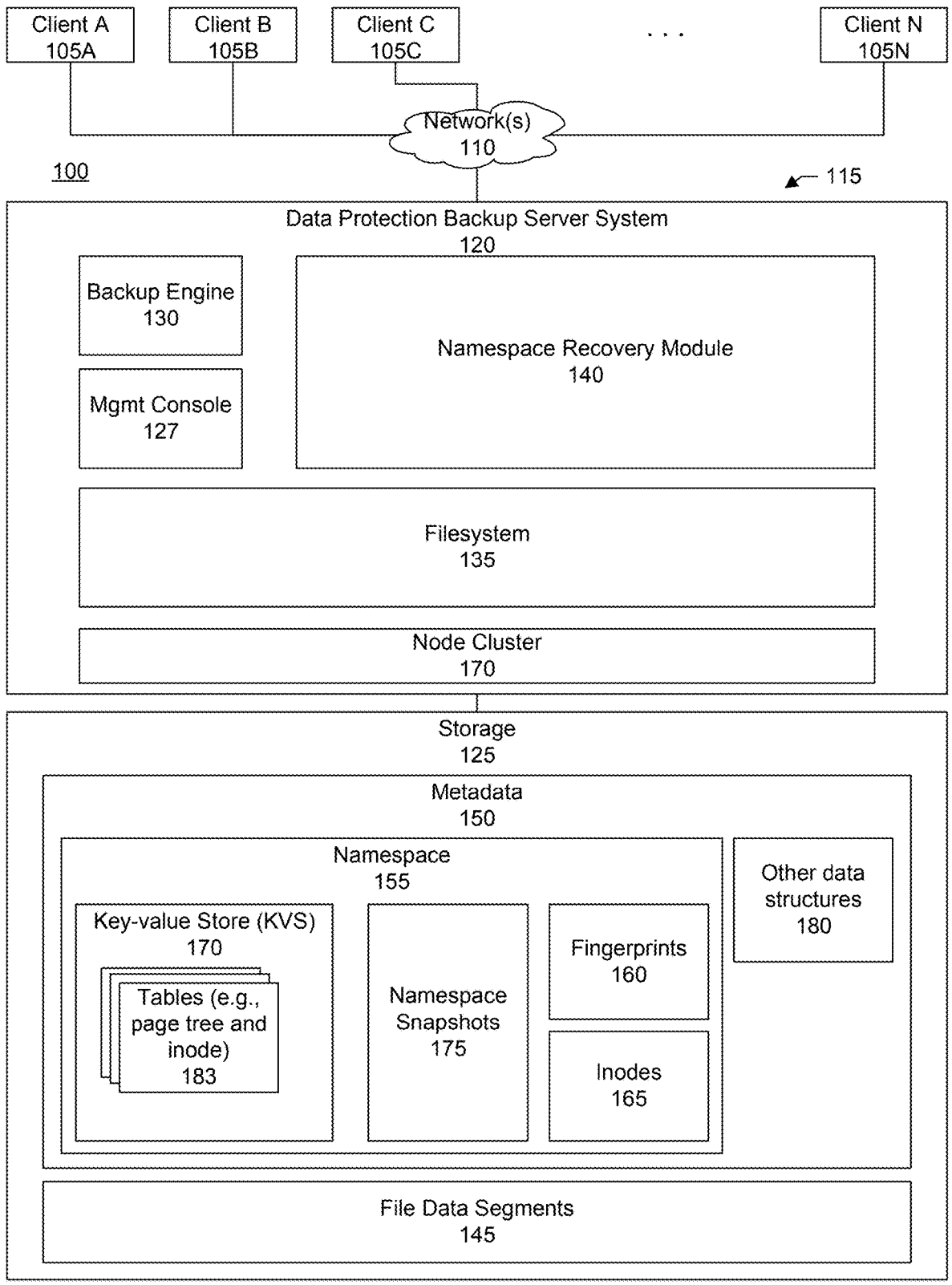
FIG. 1A shows a block diagram of an information processing system within which systems and techniques for recovering a namespace of a filesystem may be implemented, according to one or more embodiments.

The namespace component in filesystems provides a hierarchical view of named directories, files, and their associated attributes. In an embodiment, tree data structures (e.g., B+ Trees) are used internally, and this data structure can be corrupted accidentally or maliciously. In cluster-based filesystems, there are additional potential sources of corruption stemming from the complexity of the update sequence between nodes. Disclosed herein is a new method for recovering namespace data due to corruption based on insights into the nature of B+ Trees when stored on key-value store (KVS) storage systems as implemented on a filesystem such as the Data Domain Filesystem (DDFS) as provided by Dell, Inc. of Round Rock, Texas. While some embodiments are described in conjunction with the Data Domain Filesystem, it should be appreciated that aspects and principles of the systems and techniques described herein can be applied to many other filesystems.

The component of a filesystem that maintains the metadata, such as the names of files and directories and their ownership and creation time, may be referred to as the namespace. In an embodiment, B+ Trees are used to maintain this metadata because they are efficient in space usage and search time. Data integrity is paramount in filesystem components and is particularly important to the namespace since it stores the location of file data. System crashes, software bugs, and cyberattacks threaten namespace integrity by corrupting structures. Namespace snapshots, which record the state of the B+ Tree at a specific point in time, provide some defense from these events. Methods to detect corruption include those that verify the integrity of a data block, such as checksums and those that validate the contents of those blocks against other data, such as cross-checks. In an embodiment, recovery can be made using tools that either roll back the state of the filesystem to a previously known good snapshot or that repair the filesystem. Recovered files may be placed in a lost and found directory. The names of those files and their place in the directory hierarchy, however, are lost. In an embodiment, systems and techniques are provided that use database queries on a key-value store (KVS) to reduce the use of the lost and found directory and improve filesystem recovery overall.

As noted above, in an embodiment, filesystems maintain their namespace metadata in B+ Trees. Blocks of this structure, referred to here as pages, are cached in memory and persisted on permanent storage. Since it is desirable for the filesystem to allow for concurrent random access and updates to this structure, maintaining coherence between the in-memory copy and the on-storage structure involves a multi-stage transaction to serialize their data synchronization operations. In multi-node cluster filesystems, the complexity of these synchronizing updates across several nodes is even more error-prone. Even a tiny corruption can be disastrous because losing a small part of the namespace can deny access to a large amount of file data. It is, therefore, desirable to improve the resilience in the recoverability of namespace data structures.

Recovery of namespace metadata after a corruption from a crash, software error, or malicious action is complex because B+ trees, though fast and compact, are not easily reassembled when damaged. Returning to an earlier snapshot, an intact B+ tree, if one can be found can still result in a large loss of data. Placing file identities (e.g., inodes) into a lost and found directory to the extent per-file metadata can be recovered is of limited value. More particularly, any such recovery severely limits the usability because the directory hierarchy including file and directory names and their attributes are lost, leaving just arcane hooks like inode numbers to associate with the recovered metadata.

FIG. 1A shows a block diagram of an information processing system 100 within which systems and techniques to recover a namespace for KVS-persisted metadata in a filesystem may be implemented. In an embodiment, a filesystem is provided that utilizes a key-value store (KVS) for persistent storage of its namespace B+ Tree data structures.

Key-value stores are versatile and offer good read/write performance. B+ Trees, which are well-known for their cache efficiency, are little affected by the overhead of a KVS, which is relatively low. In the case of a typical filesystem namespace corruption where a failed update of the filesystem master structure (aka superblock), directory structure, or file metadata is lost, scans of the KVS can quickly reveal the availability and condition of each type of object. Should the superblock of a file-set be out of sync with a directory, KVS queries can be used to locate and reconstruct the most recent state of one with the other. Inodes can similarly be rejoined with their proper file-set and directory structure. Any lost pieces due to storage loss can be skipped. Then, the retained content can be used to reconstruct the intact portions of the file set, including directory and filenames and their relative directory hierarchy. These techniques, taken together, reduce the need for a bland, non-hierarchical lost and found directory recovery, as a fully user-consumable namespace can be more frequently resurrected.

In an embodiment, systems and techniques are provided for utilizing the structural information encoded in the KVS key for recovering a corrupt B+ Tree structure; iterating through a KVS database for the purpose of identifying the salvageable structures of a corrupt B+Tree for reconstruction purposes; performing a bottom-up construction of a B+ Tree from the leaf pages of a corrupted B+ Tree; performing a bottom-up construction of a B+ Tree from inodes extracted from a prior B+ Tree; utilization of KVS queries to assemble a knowledge base of available components to recover a damaged namespace, before starting the recovery process; and recovering the file name and directory membership of files in a lost and found directory. As used herein, the term "directory" may be used interchangeably with the term "folder."

Referring now to FIG. 1A, a set of clients 105A-N are connected via a network 110 to a data protection backup system 115. The data protection system includes a data protection server 120 and storage system 125 connected to the data protection server. The data protection system is hosted by an underlying cluster of nodes 127. The storage system may be referred to as a backup or secondary storage system.

The data protection server includes a management console 127, backup engine 130, filesystem 135, and, namespace recovery module 140. The management console provides a user interface (UI) to the data protection system. The interface may be a graphical user interface (GUI), shell, or command line. The interface may be a programmatic interface such as an application programming interface (API). A user, such as an administrative user, can use the management console to administer, configure, and manage the system. This includes, for example, authoring data protection policies, defining backup schedules, identifying clients, files, and folders to be backed up, performing recoveries, and other management tasks.

The backup engine is responsible for backing up (e.g., copying) files on primary storage of the clients to secondary storage of the data protection system. The backed up files stored in secondary storage may be stored in a format that is different from a native format of the primary file copies at the clients. For example, backups may be stored in a compressed format, deduplicated format, or both.

The namespace recovery module provides a set of services for recovering a namespace that has been damaged. In an embodiment, the recovery module includes a KVS query unit that is responsible for generating and issuing queries to the KVS, a tree construction unit that is responsible for reconstructing a tree data structure holding the namespace metadata based on the items returned from the KVS queries, and a filename/inode recovery unit that is responsible for associating, connecting, or linking recovered files back to their corresponding inodes or filenames.

Storage of the data protection system includes file data segments 145 and metadata 150. Metadata includes a namespace 155, fingerprints 160, inodes 165, KVS 170, namespace snapshots 175, and other data structures 180.

Filesystem Namespace

The filesystem organizes the files and other data stored in the storage system and presents that data in a logical format to the clients and applications. Different nodes of the cluster may be assigned different portions of the filesystem namespace to manage. The filesystem coordinates the activities of the nodes as they carry out various filesystem operations such as namespace operations, rename, file operations (e.g., write or read), folder operations, copy, deduplication, compression, building file trees, and so forth.

In an embodiment, the filesystem is a logging-based filesystem. In a logging-based filesystem, new data written to the filesystem does not necessarily overwrite old data. A log is a type of data structure in which writes are made at a head of the log. Writes are made to disk sequentially in a log-like structure. Since disk space is finite, however, a space recovery mechanism referred to as a garbage collector can be periodically run to reclaim or recover disk space. Even so, running the garbage collection process does not necessarily delete old data. Rather, the garbage collection process marks locations or areas on disk that can be reused.

Figure 1B:
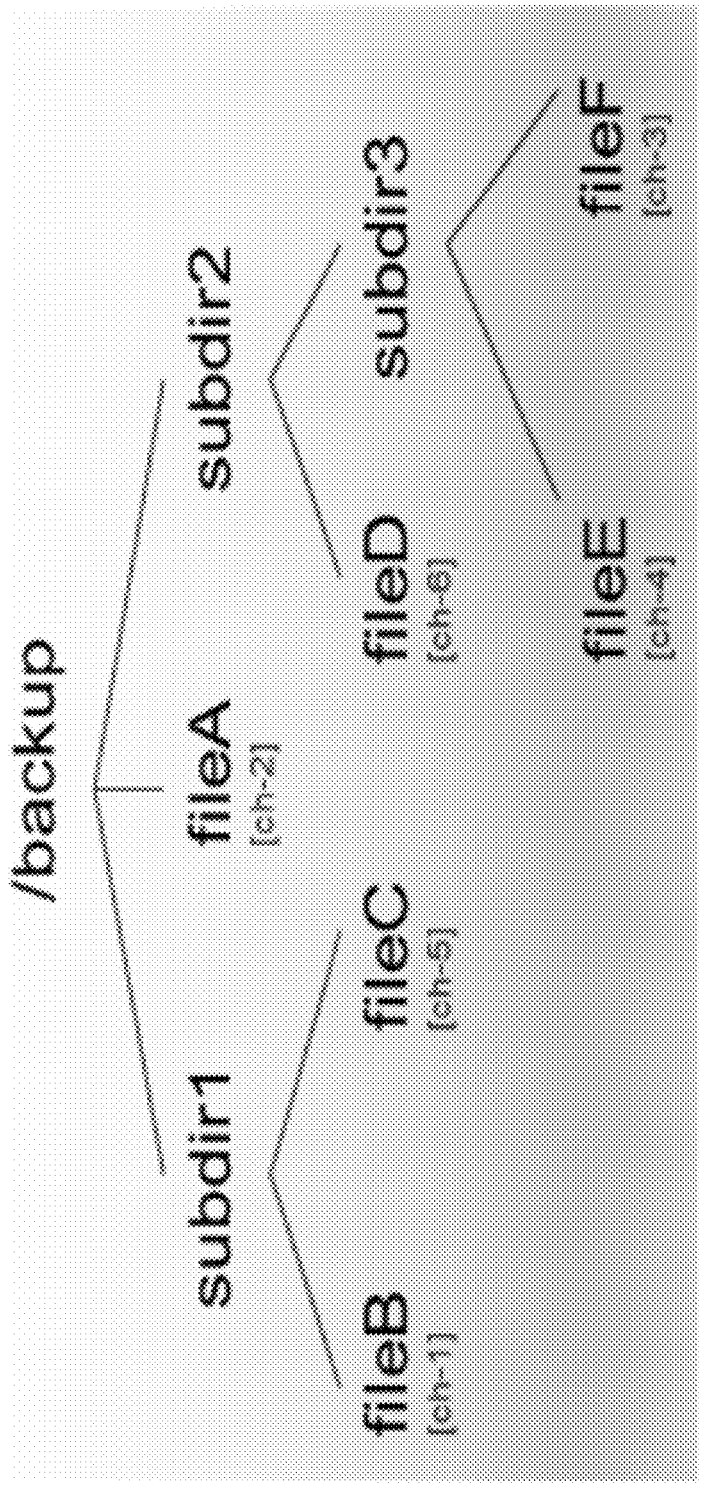
FIG. 1B shows an example of a namespace hierarchy of directories and files, according to one or more embodiments.

In an embodiment, the filesystem stores user data as files in a hierarchy of directories, also known as folders in the namespace. For example, FIG. 1B shows a namespace hierarchy of directories and files. The inode is a structure of similar name and make up in many modern filesystems and it includes metadata such as information on the file's ownership, modification, and that file's location on disk in the form of direct and indirect pointers. In an embodiment, inodes reference a file's persistent storage in the form of a unique content handle (CH), which allows access to the file's data. Damage to a namespace include the loss, corruption, or misplacing of files, directories, and their respective metadata.

In an embodiment, the filesystem is a deduplicated filesystem. A deduplicated filesystem is a type of filesystem that can reduce the amount of redundant data that is stored. In a deduplication-based system, data such as files to be backed up are divided into a set of segments. The segments are hashed to generate a set of fingerprints. These fingerprints uniquely identify the segments. The data protection system maintains metadata separate from the actual client data being backed up. The metadata includes a collection of fingerprints corresponding to data segments that already exist on the backup storage system. If the fingerprint of a data segment from a file to be backed up does not match an existing fingerprint, the data segment is written to the physical disk storage of the storage system and the fingerprint is added to the collection of existing fingerprints. If, however, the fingerprint matches an existing fingerprint, the data segment is determined to be a duplicate and is not written to the storage system. Instead, a reference is generated that points to the already existing data segment on backup storage that corresponds to the fingerprint. The reference is stored as metadata by the data protection backup system so that the file can be reconstructed or reassembled as part of a restore operation.

Figure 2:
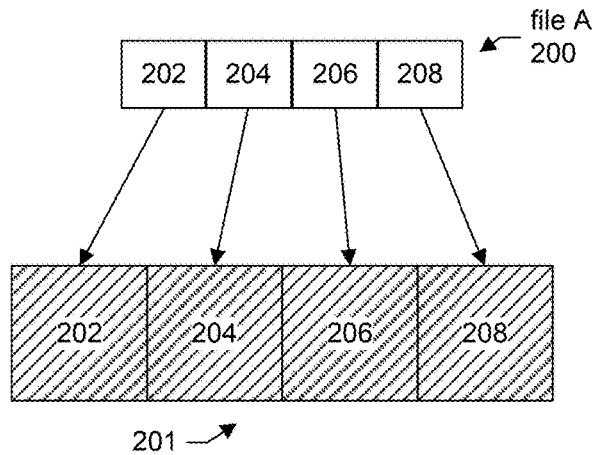
FIG. 2 shows an example of a deduplication process of a filesystem in a first state, according to one or more embodiments.
Figure 3:
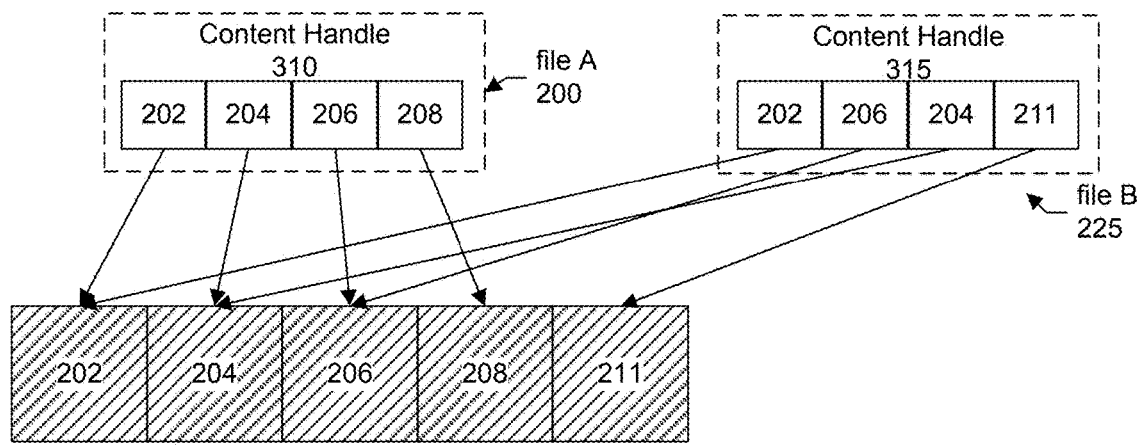
FIG. 3 shows an example of the deduplication process of the filesystem in a second state, according to one or more embodiments.

More particularly, FIGS. 2-3 show block diagrams illustrating a deduplication process of the filesystem according to one or more embodiments. FIG. 2 shows an example of the filesystem in a first state. As data, such as an incoming client user file A 200 enters the filesystem, it is segmented into data segments 201. Identifiers are calculated for the segments. In an embodiment, the identifiers include fingerprints. A cryptographic hash function (e.g., Secure Hash Algorithm 1 (SHA1)) is applied to the segments to calculate the fingerprints (e.g., SHA1 hash values) for each of the data segments making up the incoming file. In the example shown in FIG. 2, the fingerprints are 202, 204, 206, and 208. A fill pattern indicates the data segments corresponding to the fingerprints.

FIG. 3 shows an example of the filesystem in a second state, after the first state. A client user file B 225 has likewise been segmented into data segments. Fingerprints (202, 206, 204, and 211) have been calculated for each of the segments and filtered against existing segments to remove duplicates (e.g., duplicate segments 202, 206, and 204). New or non-redundant segments (e.g., 211) are stored. Thus, a segment not having matching fingerprints may be stored. A segment that happens to be the same as another segment (based on having matching fingerprints) may not be again stored. This helps to eliminate redundant data and conserve storage space.

Metadata, however, is generated and stored that allows the filesystem to reconstruct or reassemble the file using the already stored or previously stored and existing segments. Since the files share some identical segments, referencing the segments using the fingerprints allows a single instance of a particular segment to be stored, thus reducing redundant or duplicate data. The fingerprints or identifiers referencing the segments are substantially less in size that the actual data segments themselves.

Figure 4:
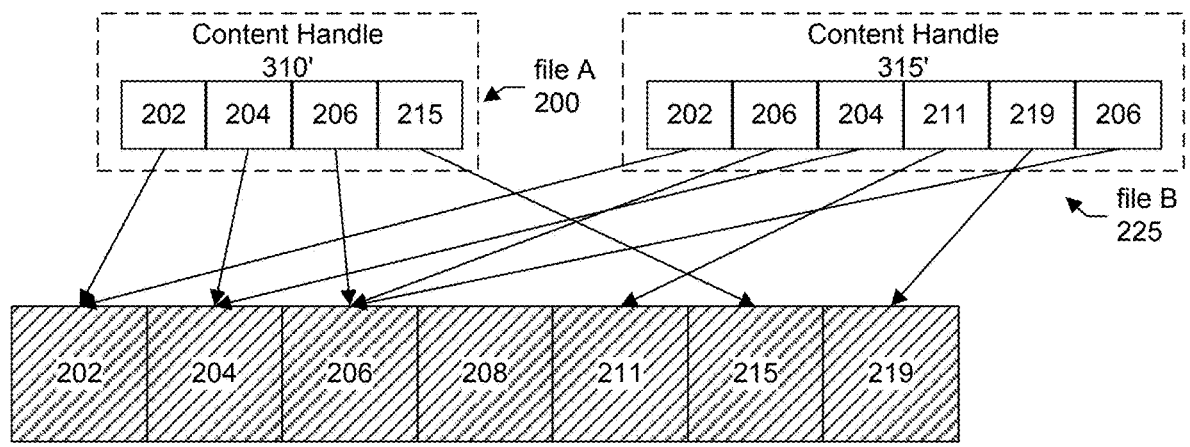
FIG. 4 shows an example of the deduplication process of the filesystem in a third state, according to one or more embodiments.

FIG. 4 shows an example of the filesystem in a third state, after the first and second states. In this example, the files have been modified such that file A references segment 215 instead of 208. File B references a new segment 219 in addition to segments 202, 206, 204, 208, and 211, and has an additional reference to segment 206.

Each file is associated with a content handle (CH) that represents data content of a file at a particular point-in-time. A content handle of a file may be generated based on an ordered collection of fingerprints corresponding to data segments making up the file. For example, referring back now to a state of the filesystem as shown in FIG. 3, file A has a content handle 310 based on fingerprints 202, 204, 206, and 208. File B has a content handle 315 based on fingerprints 202, 206, 204, and 211. In the example of FIG. 4, however, the content handles for files A and B are now 310' and 315', respectively, to indicate that they have changed based on their modifications. In other words, content handle 310 is different from content handle 310'; and content handle 315 is different from content handle 315'. A content handle may be viewed as a compact snapshot of a file's data contents. The content handle of a file thus encodes content of the file into a name of the file.

Figure 5A:
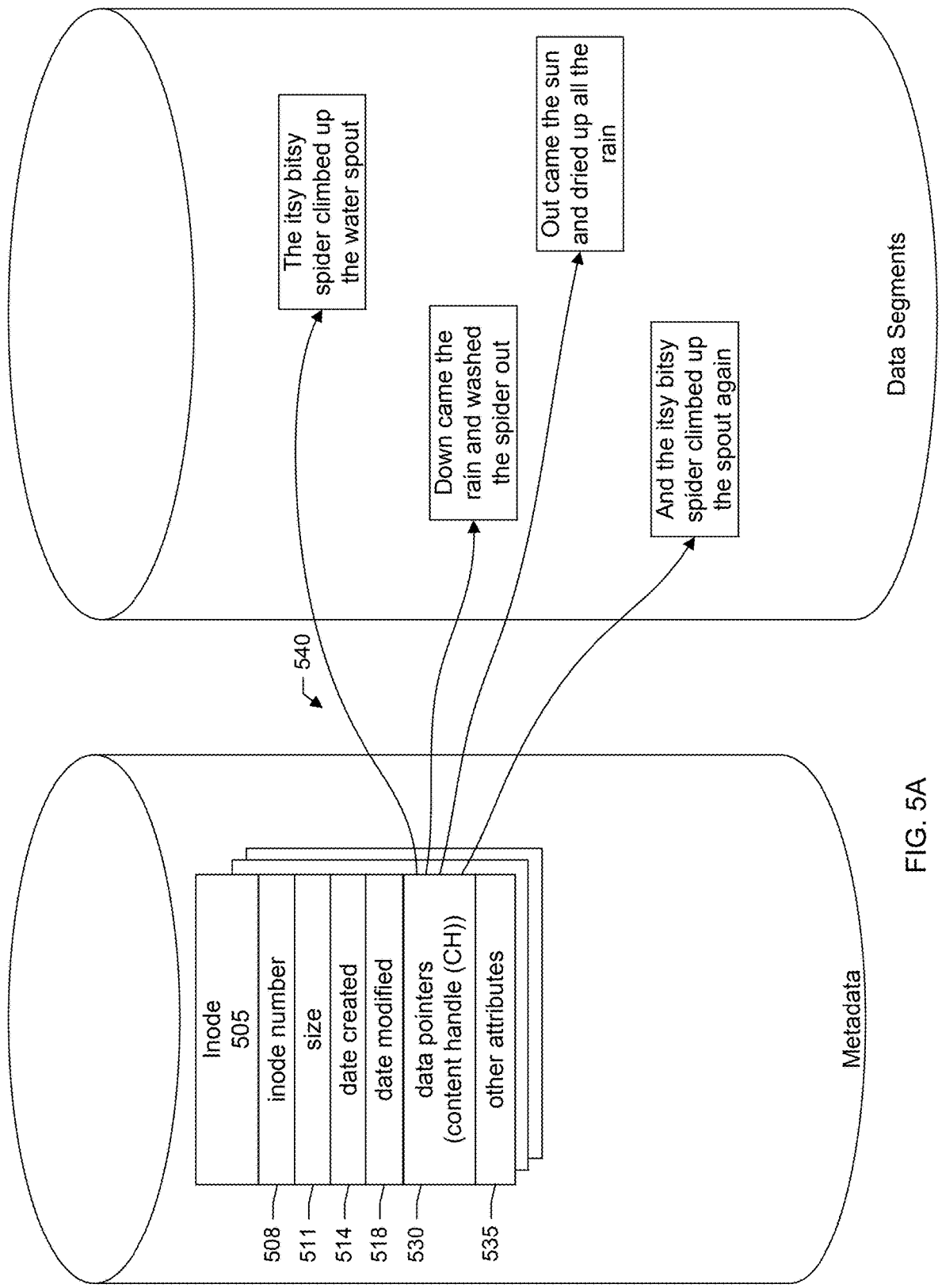
FIG. 5A shows a block diagram of an inode, according to one or more embodiments.

Referring back now to FIG. 1A, the data protection system maintains, in addition to data segments of making up client files, other data or metadata to facilitate organization, search, point-in-time recoveries, and so forth. For example, an inode is a type of data structure that may be stored by the filesystem. In an embodiment, each file in the filesystem is associated with an inode. The inode associated with a file stores metadata about the file. FIG. 5A shows a block diagram of an inode 505. The inode includes an inode number 508. The inode number uniquely identifies the inode from among other inodes in the filesystem. Other attributes of the inode may include a size 511 indicating a size of a file associated with the inode, date created 514 indicating a time and date the file was created, date modified 518 indicating a time and date the file was last modified, a set of data pointers 530, and other attributes 535 (e.g., file owner, file permissions, and so forth). The data pointers store location information or addresses mapping 540 the inode to the actual data.

Referring back now to FIG. 1A, the snapshots include point-in-time copies of the filesystem namespace. Snapshots can be used to restore the filesystem to a previous state, preserve a moment in time for reference or for later use, assist with testing and debugging by reproducing a particular state of the filesystem, disaster recovery, and so forth. Snapshots can be created very quickly because they are logical rather than actual copies of data. For example, it can be much faster to designate an area on disk for a snapshot and use pointers to data as compared to copying the entire actual source data. In particular, a snapshot includes a set of reference markers or pointers to the actual data. There are many ways to generate a snapshot including copy-on-write (COW), redirect-on-write, clone or split mirror, and others.

There can be user-generated snapshots, system-generated snapshots, or both. User-generated snapshots refer to snapshots of the filesystem that are initiated by the user. For example, a user may configure a policy to generate snapshots every hour, every 2 hours, or any other time interval as desired. System-generated snapshots refer to snapshots of the filesystem that are initiated internally by the filesystem. For example, the filesystem may be configured to automatically take snapshots at periodic intervals (e.g., every 15 minutes). Again, such snapshots can be used to help recover the filesystem to a previous state.

The namespace provides a hierarchical organizational structure for identifying filesystem objects through a file path. A file can be identified by its path through a structure of folders and subfolders in the filesystem. A filesystem may hold many millions of files across many different folders and subfolders and spanning thousands of terabytes. The namespace contains metadata for the files. The metadata may include, for example, filenames, timestamps indicating when the files were modified, timestamps indicating when the files were created, pointers or references to file content, and so forth.

A key-value store is a type of data structure that stores data as a set of unique identifiers, each of which have an associated value or blob of data. This data pairing may be referred to as a "key-value pair." The unique identifier is the "key" for an item of data, and a value is either the data being identified or the location of that data. Key-value stores, as compared to traditional relational databases, can offer very fast performance for reads and writes, in part because the database is searching for a single key and is returning its associated value rather than performing complex aggregations as may be the case with relational databases.

The key-value store includes a set of tables 183 to organize, logically group, and store the namespace metadata. In an embodiment, the key-value store includes a first table that may be referred to as a page tree table, and a second table that may be referred to as an inode table. Table A below shows an example of the page tree table.

TABLE A

| Key | Value |
|---|---|
| key (page ID) | page content |
| ... | ... |

Table B below shows an example of the inode table.

TABLE B

| Key | Value |
|---|---|
| key (inode number) | inode content |
| ... | ... |

As discussed, in an embodiment, the namespace is represented as a B+ tree where pages of the tree are written to the key-value store. Page identifiers form the keys of the key-value store and page content form the values of the key-value store. The inode table organizes the inodes associated with the files in the filesystem. The tree data structure includes the folder and file structure as well as file inodes. Thus, operations on the namespace or tree involve operations on the key-value store. For example, an insert or put operation adds a new key-value pair to the store. A get or retrieve operation retrieves the value associated with a given key. An update operation modifies the value associated with a specific key. A delete or remove operation removes a key-value pair from the store. In an embodiment, the key-value store supports searching via query languages. For example, items in the key-value store can be filtered and sorted.

In an embodiment, the KVS keys (e.g., page keys and inode keys) are named or formed by encoding or embedding structural metadata information associated with the tree. A page key itself includes a page number, identification of a logical partition (e.g., MTree) to which the page belongs, and associated snapshot. The page key itself thus identifies a B+ tree page and points to a blob of data corresponding to the B+ tree page. Similarly, an inode key itself includes an inode number, identification of the logical partition, and associated snapshot.

The metadata included with the naming of the keys facilitates reconstruction of the namespace and querying operations on the key-value store to search for specific keys and retrieve the corresponding results, values or items during namespace recovery. In an embodiment, systems and techniques involve iterating through the KVS to recover a damaged namespace or, more particularly, damaged portions of a tree holding the namespace. The portions of the namespace requiring recovery may have been captured in one or more previous snapshots of the namespace. These undamaged portions from the previous snapshots can be retrieved from the KVS via the queries to reassemble the tree.

B+ Trees for Metadata in Logging-based Filesystem

In an embodiment, the namespace is held in a tree data structure and, more specifically, a B+ Tree. As discussed, in an embodiment, the filesystem is a logging-based filesystem which implements a copy-on-write scheme where new data does not overwrite old data but allocates new data blocks for that purpose. That means old data remains present and available for recovery until cleaned via garbage collection (GC).

Mtrees as File sets

In an embodiment, the filesystem supports manageable file sets that may be referred to as Mtrees. That is, the filesystem may be partitioned into multiple logical partitions. These are standalone filesystems inside a larger filesystem that encloses them. These logical partitions or Mtrees are mountable portions of the filesystem and can be named by the user, while the system internally uses a unique identifier for the logical partition. In an embodiment, the identifier of the logical partition is referred to as an Mtree ID (MID). In an embodiment, as many as 256 separate Mtrees can exist in each instance of the filesystem. Corruption is often limited to a single Mtree, but it is desirable that recovery proceed quickly to limit or reduce downtime to the unaffected Mtrees.

Utree

Figure 5B:
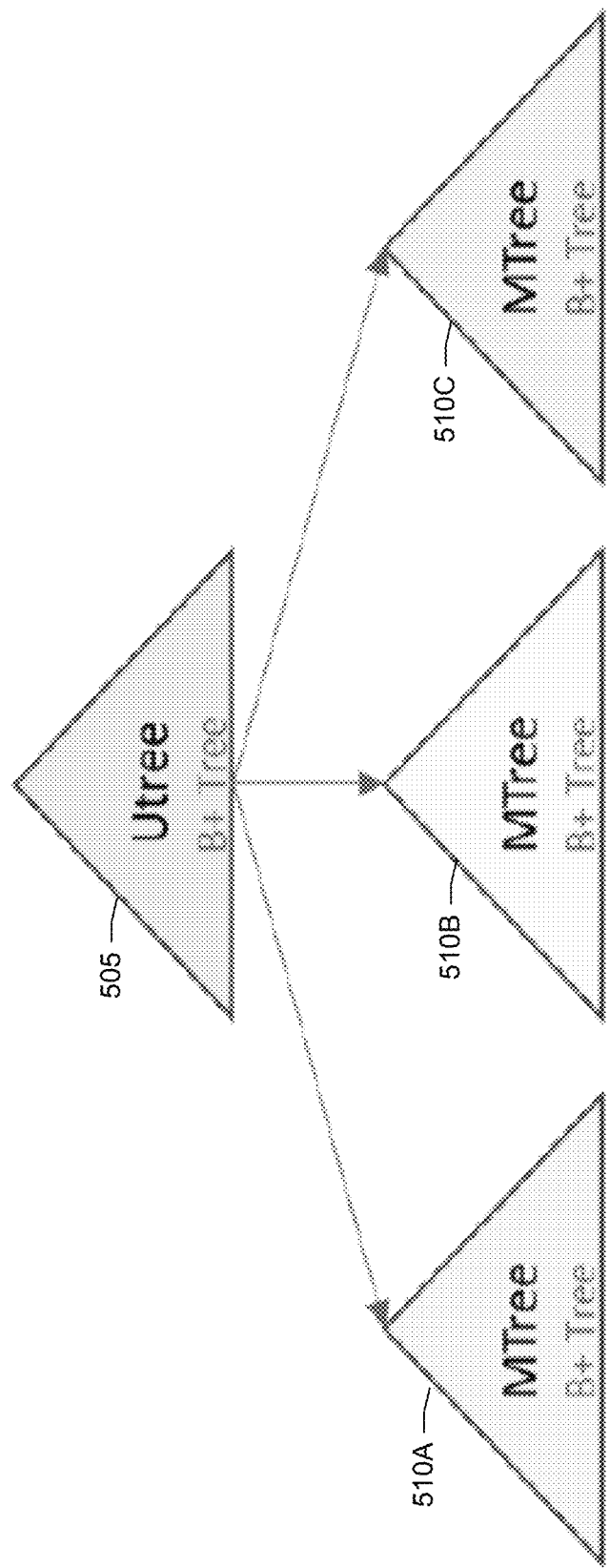
FIG. 5B shows an example of a Utree organizing logical partitions of the filesystem, according to one or more embodiments.

FIG. 5B shows an example of a first tree data structure 505 being used to track multiple other second tree data structures 510A-C, each second tree data structure corresponding to a logical partition or Mtree. In an embodiment, the first tree data structure may be referred to as a Utree. In an embodiment, since the filesystem can support hundreds of Mtrees, keeping track of them is done using another B+Tree—the Utree. Corruption of the Utree is possible, but it can be reconstructed from the existing Mtrees if such information is readily available.

Snapshots

Point-in-time images of an Mtree can be collected by taking a snapshot. A user-assigned name and an internal snapshot ID (SID) may be used to identify snapshots. Mtrees can be recovered by assuming the content of an earlier snapshot of that tree via a rollback process. In an embodiment, as snapshots are taken of the namespace, the snapshot ID is incremented so as to uniquely identify the snapshot. That is, updating a sequence of snapshot identifiers includes incrementing a value of a snapshot identifier. Thus, snapshots with high snapshot IDs indicate more recent snapshots as compared to snapshots with low snapshot IDs. It should be appreciated, however, that the updating the sequence of snapshot identifiers may instead include decrementing a value of the snapshot identifier; in which case snapshots with low snapshot IDs indicate more recent snapshots as compared to snapshots with high snapshot IDs. Any mathematical operation or combination of mathematical operations may be used to maintain the sequence of snapshot identifiers so long as the algorithm is consistently applied for each snapshot that is taken of the namespace.

B+ Trees

Figure 6:
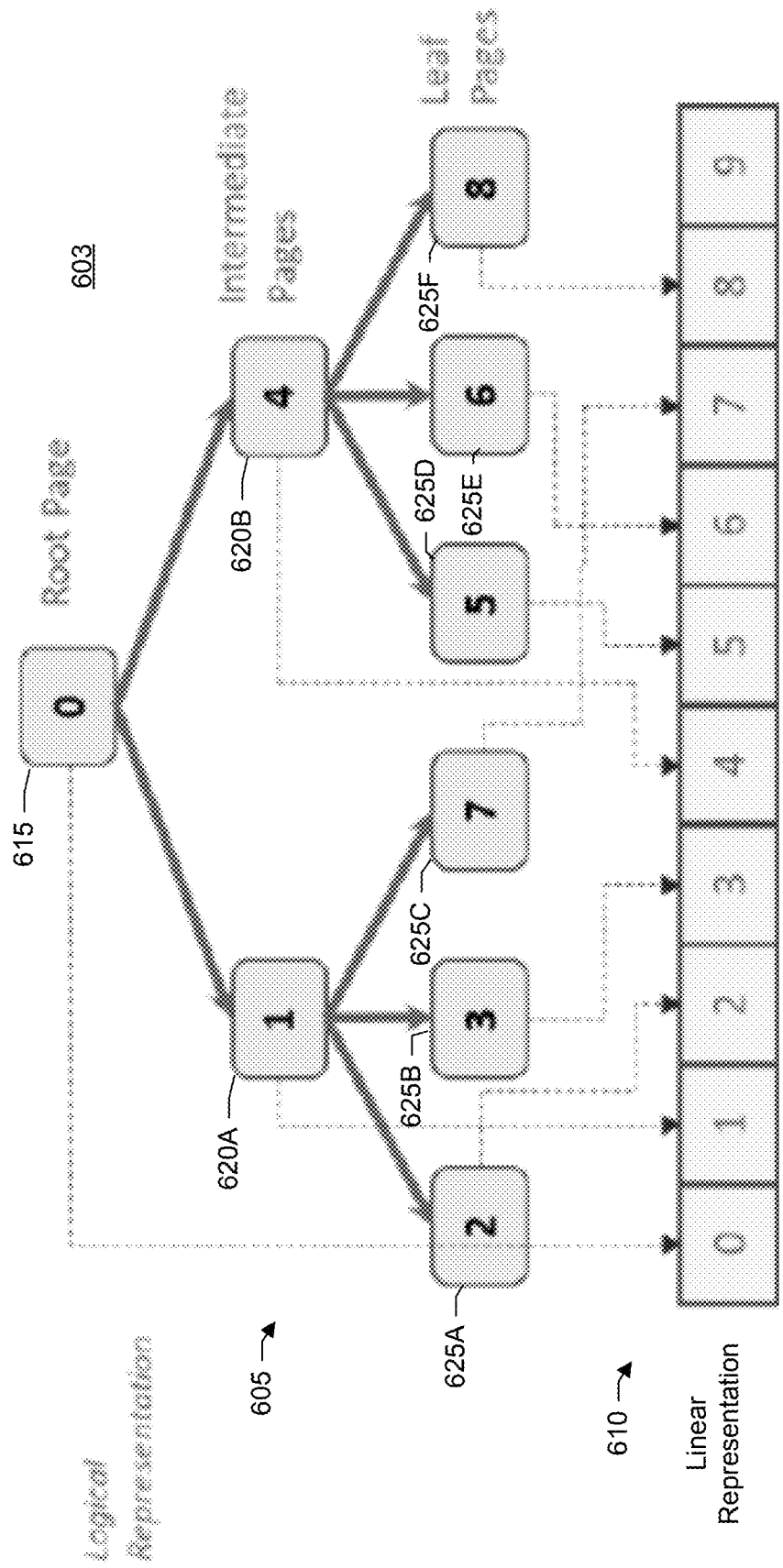
FIG. 6 shows a block diagram of a B+ Tree, according to one or more embodiments.

FIG. 6 shows an example of a B+ Tree 603 in a logical representation 605 and a linear representation 610. In this example, there is a root page 615, intermediate pages 620A,B, and leaf pages 625A-F. The broken lines shown in FIG. 6 map the pages from their logical representation in the tree to their representation as a linear sequential set of pages on disk, e.g., flattened on-disk layout. In other words, the tree may be represented as a line of pages of data.

In an embodiment, Mtrees are represented internally as a B+Tree with three intermediate levels. For simplicity, the example shown in FIG. 6 shows a single intermediate level with the following factors: 1) A B+ tree is a balanced tree of fixed depth; 2) Each node in the tree is a "page" of 64 KB; and 3) Pages refer to each other via a page number (e.g., 0-8). The root page of a B+ Tree (page 0) contains general information equivalent to what the superblock contained in older filesystems. The integrity of each page is protected by a checksum that is verified to check for corruption.

Intermediate Pages and Interior Keys

The intermediate page stores lookup keys (not to be confused with KVS keys) that reference other intermediate or leaf pages. It does not store any file metadata that is needed for recovery. An intermediate page may be referred to as an INT page and references other INT pages or leaf pages by interior keys. These pages contain sorted indexable references to thousands of subordinate pages, allowing a maximum-size structure referencing billions of files. The corruption of a single INT page can result in lost access to thousands of subordinate pages and requires a bottom-up method for proper reconstruction.

Leaf Page B+ Tree Full Keys

The leaf page contains "key/value" pairs (also not to confused with a KVS key). In an embodiment, a B+ Tree full key is a 128-bit number kept in sorted order on the page. It is accompanied by "value," which is an index to data associated with that key and is also referred to here as a "payload." In an embodiment, the 128-bit key comprises a 64-bit PID, or parent file ID (the ID of the directory that owns this item), and a 64-bit CID, or child file ID, which is exported to external references for file access. Corruption of leaf pages and their B+ Tree keys or value components is the discrepancy due to the frequency of updates to these structures.

B+ Tree Keys for File Creation

Figure 7:
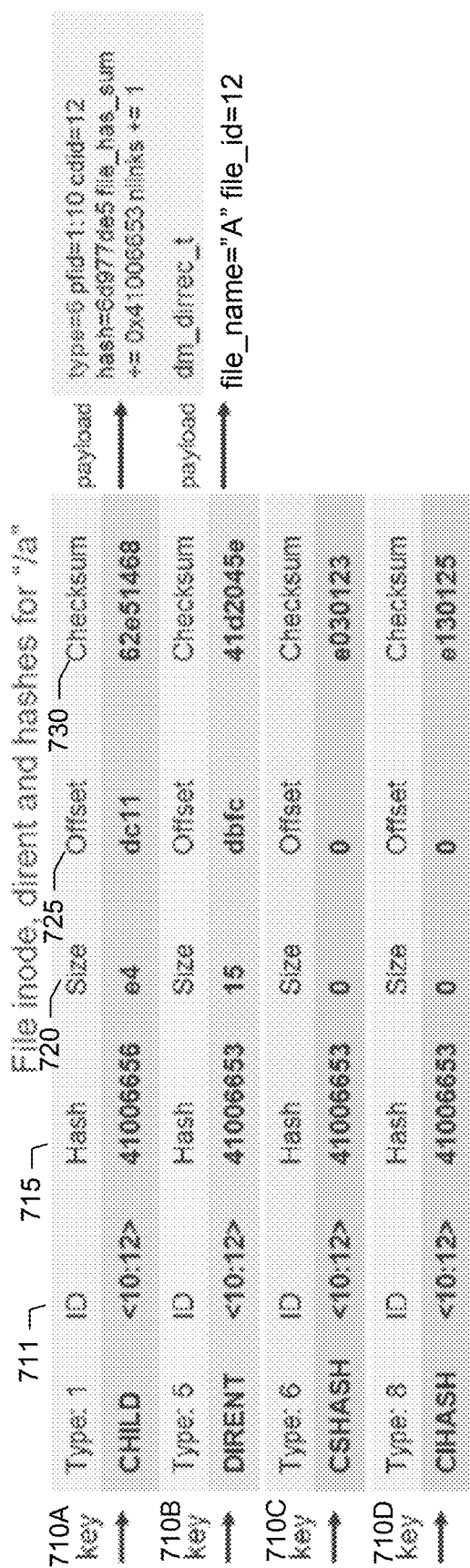
FIG. 7 shows an example of a leaf page with four full keys per file, according to one or more embodiments.

FIG. 7 shows an example of a leaf page 705 including some keys held by the leaf page and payloads corresponding to the keys. Payloads represent the actual metadata. In an embodiment, four full keys are stored in the leaf page for each created file. The example shown in FIG. 7 creates a file with the name "/a." Since the filesystem is new, its parent ID is 0×10 (decimal 16), and the file ID of the file itself is 0×12 (decimal 18). All four keys land in sequence on the same leaf page in this example. However, as noted above, in a well-populated filesystem with hundreds of files in the same directory, the hashes may end up on an entirely different leaf page, thus complicating recovery.

Thus, as shown in example of FIG. 7, full keys 710A-D have been created for a file "/a." First full key 710A may be referred to as a CHILD key. Second full key 710B may be referred to as a DIRENT key. Third full key 710C may be referred to as a CS_HASH key. Fourth full key 710D may be referred to as a CI_HASH key.

Each full key is tagged with an identifier (ID) 711 that identifies a parent and an actual file ID. For example, for the identifier "<10:12>" as shown in the example of FIG. 7, the value "10" identifies a parent or directory that file "/a" resides in, and the value "12" identifies the actual file ID or inode number. Thus, the first value may be referred to as a parent ID (PID) and the second value may be referred to as a child ID (CID). As shown in the example of FIG. 7, a payload of the CHILD key contains the ID of the parent (e.g., "10"). A full key may further contain a hash 715, a size 720 of the payload, an offset 725 identifying a location in the page where the payload resides, and a checksum 730 calculated from the key and accompanying data so as to make the key self-identifying. In other words, the checksum may be calculated based on the type of key, ID, hash, size, and payload, or combinations of these.

The CHILD key contains inode type information including the tag, a DIRENT which contains the file's name, and two hash keys. The CS_HASH key contains a hash of the file name in a case-sensitive way, and the CI_HASH contains a case-insensitive hash of the same. Given that the tag contained in the CHILD key, and is encoded PID:CID, it can only be involved in filtering the other PID:CID keys since they are nearby. Those keys which are PID: hash format will be located elsewhere in the B+ Tree for a given file.

In an embodiment, a file is associated with at least first and second full keys. The first full key references a payload containing a pointer to content or data of the file. The second full key is a key separate or different from the first full key and references a payload containing a name of the file. In another embodiment, a file is associated with additional full keys including a third full key, fourth full key, or both. The third full key contains a case-sensitive hash of the name of the file. The fourth full key contains a case-insensitive hash of the name of the file. These additional full keys can be used to speed lookups of files using a case-sensitive technique or a case-insensitive technique. The case-insensitive technique can be used to support filesystems such as Windows by Microsoft Corporation which have case-insensitive protocols. Thus, third and fourth full keys can be recreated so long as the full key containing the name of the file (e.g., second full key) can be recovered.

B+ Tree Keys for File Naming and Directory Membership

In an embodiment, inode information is stored in a CHILD key and its name information is stored in the DIRENT, CSHASH, and CIHASH keys. A file can have two or more names (referred to as "hard links"), and that set of three keys can be in some other part of the B+ Tree (on a different leaf page). A new set of keys is created when a file is renamed, removing the original three file-name-related keys. The original CHILD key remains logically in the exact location in the hierarchy. This separation of file metadata and file name information can be problematic during inadvertent or intentional metadata corruption, where a file can be left orphaned without a corresponding name or no longer references an existent file.

Figure 8:
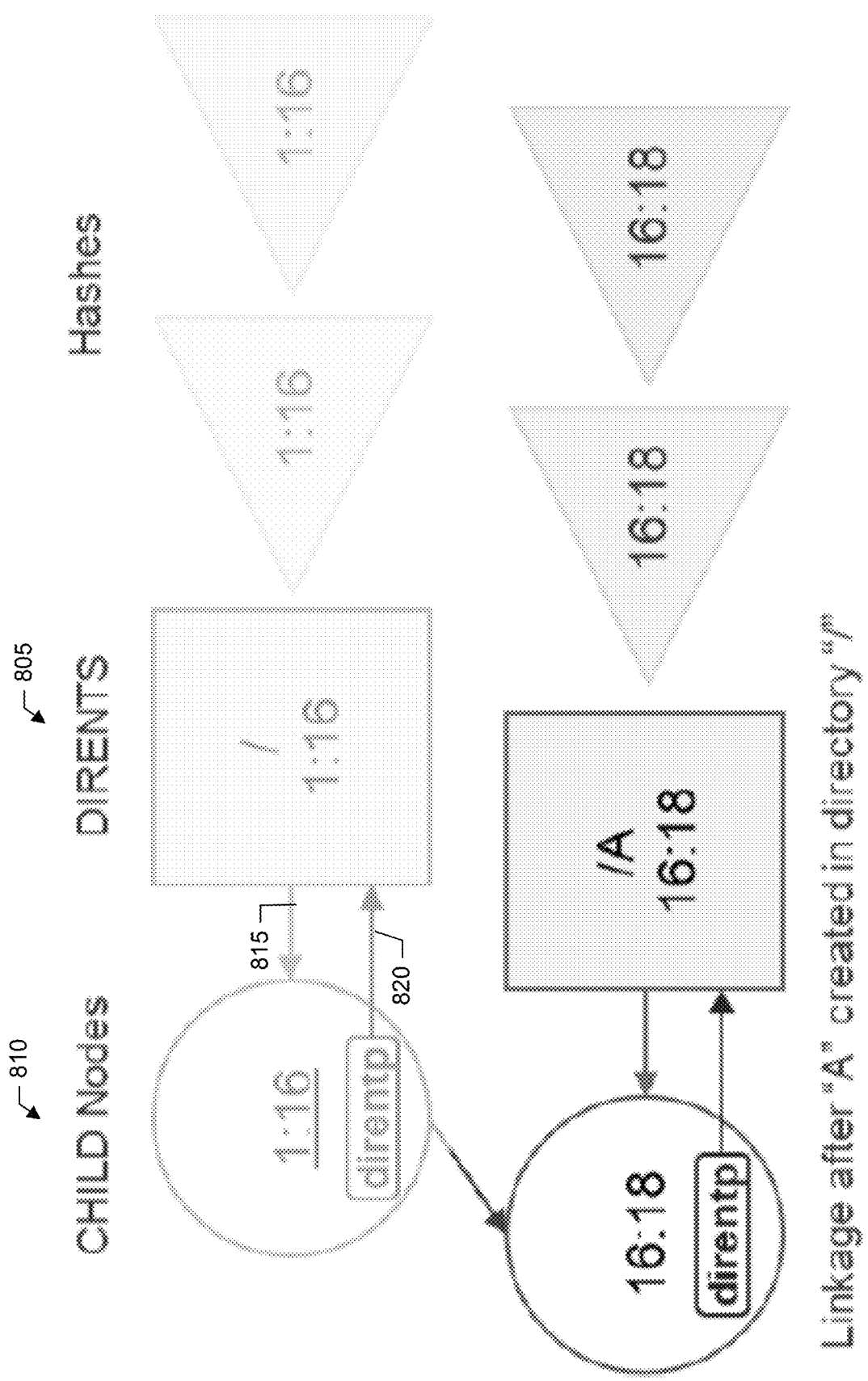
FIG. 8 shows a block diagram of the relationship of DIRENTs to CHILD keys, according to one or more embodiments.

FIG. 8 shows a block diagram of the relationship of DIRENTs 805 to CHILD keys 810. In an embodiment, filename DIRENTs point 815 to their inode CHILD full-keys, and those inodes contain a back-pointer 820 to their primary DIRENT. The back-pointer infrastructure can be helpful in recovery. The root directory "/" and a subordinate file "A" are shown with the respective keys in the example shown in FIG. 8. In other words, within the inode is a pointer P that is a pointer back to the name of the file.

The Use of a KVS for B+ Tree Storage

As discussed, in an embodiment, Mtree metadata is persisted in a distributed key-value store (KVS). Each page is accessed in the KVS page table via a key composed of the MID, SID, and page number. That is, a page may be identified as page <MID:SID:Page_no>. When a page is modified after a recent snapshot, it is copied, and its SID is updated via a copy-on-write method. For example, in an embodiment, a current tree is referred to as an active tree. When a snapshot is taken of the active tree, the snapshot is assigned the snapshot ID belonging to the previously active tree, and the now active tree is assigned an updated or incremented snapshot ID. Pages may be shared between snapshots to conserve space.

Namespace Recovery

In an embodiment, namespace recovery includes conducting KVS page queries and enumerations. FIG. 9 shows a flow for recovery, according to one or more embodiments.

Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 910, page keys are formed in a KVS storing metadata of a filesystem. The filesystem may be partitioned into a set of logical partitions. The page keys identify pages of trees within which namespaces of the logical partitions are held. The pages include leaf pages. The leaf pages include first and second full keys associated with each file of a file set in a logical partition. The first full keys store inodes for the files in the file set. The second full keys store filenames for the files in the file set.

In a step 915, inode keys are formed in the KVS. The inode keys identify inodes of the files in the file set.

In a step 920, some of the filesystem metadata is embedded into the page keys. More particularly, in an embodiment, each page key includes an identifier of a logical partition, an identifier of a snapshot taken of a namespace of the logical partition, and a page number to a page in a tree data structure holding the namespace. Thus, tree pages may be stored in the KVS with keys having the form <MID:SID:Page_number>, where MID is the logical partition or Mtree ID for the namespace, SID is the snapshot ID for the namespace, and Page_number identifies a page in the tree. The root of the tree may be identified as page 0. The root page for the logical partition or Mtree is likewise stored in the KVS with the key name <MID:SID:0>.

In a step 925, some of the filesystem metadata is embedded into the inode keys. More particularly, in an embodiment, each inode key includes the logical partition identifier, the snapshot identifier, and an inode number of an inode to a file in the file set. Thus, inode pages may be stored in the KVS with keys having the form <MID:SID:Inode_number>.

In a step 930, a determination is made that recovery operations are needed for the namespace.

In a step 935, the KVS is queried for items needed to recover the namespace. For example, the namespace associated with an active tree may be corrupted due to one or more of a leaf page that has become corrupted, a leaf page that is missing, a leaf page having a missing CHILD key for a file, a leaf page having a missing DIRENT key for the file, or other problem. KVS queries can be generated to search previous snapshots for the missing items.

In a step 940, the namespace is recovered using the items retrieved from the KVS. The recovered namespace may be a composite or amalgamation of items from one or more other previous snapshots taken of the namespace. For example, the recovered namespace may include a leaf page from a previous snapshot of the namespace. The recovered namespace may include a leaf page having a CHILD key recovered from the same or different previous snapshot of the namespace. The recovered namespace may include a DIRENT key recovered from the same or different previous snapshot of the namespace. The recovered namespace may include any number of leaf pages recovered from any number of previous snapshots of the namespace. For example, the recovered namespace may include a first leaf page from a first snapshot of the namespace and a second leaf page from a second snapshot of the namespace. The first snapshot may have been taken at a first time. The second snapshot may have been taken at a second time, different from the first time. For example, the first time may have been before the second time. The second time may have been after the first time.

Figure 10:
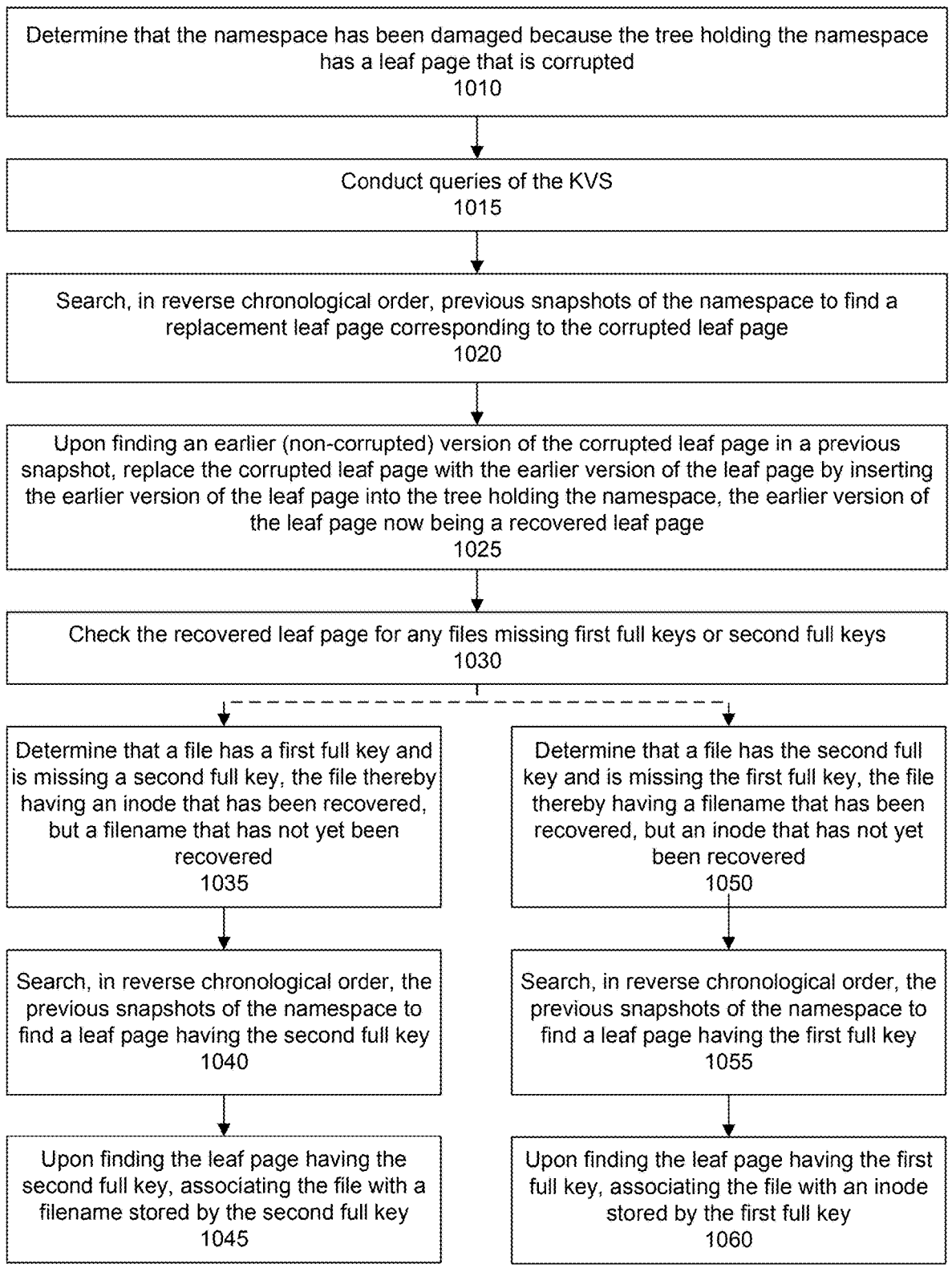
FIG. 10 shows further detail of a flow for namespace recovery, according to one or more embodiments.

FIG. 10 shows further detail of a flow for recovering the namespace. In a step 1010, a determination is made that a namespace has been damaged because a tree holding the namespace has a leaf page that is corrupted. For example, a checksum of the leaf page may have failed to match a valid checksum for the leaf page.

In a step 1015, queries are conducted of a KVS storing the tree. More specifically, in a step 1020, previous snapshots of the namespace are searched in reverse chronological order to find a replacement leaf page corresponding to the corrupted leaf page. Searching in reverse chronological order helps to ensure that the latest recoverable information is recovered.

In a step 1025, upon finding an earlier (non-corrupted) version of the corrupted leaf page in a previous snapshot, the corrupted version of the leaf page is replaced with the earlier but non-corrupted version of the leaf page by inserting the earlier version of the leaf page into the tree holding the namespace, the earlier version of the leaf page now being a recovered leaf page.

Figure 11:
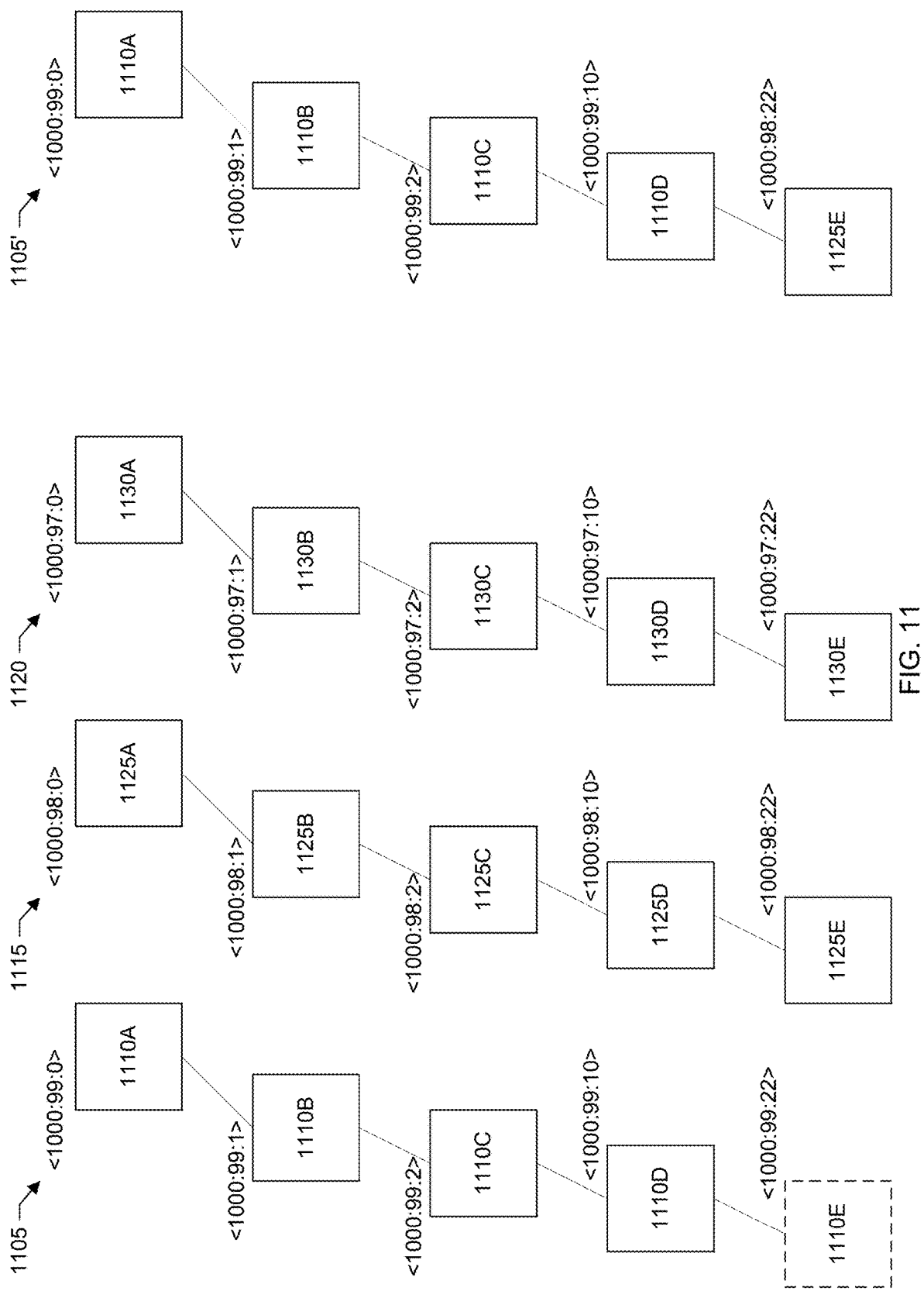
FIG. 11 shows an example of recovering a B+ Tree for the namespace, according to one or more embodiments.

FIG. 11 shows an example of namespace recovery of a Btree (or Mtree) 1105 having a corrupted leaf page (steps 1010-1025 (FIG. 10)). Consider, as an example, that the Btree is the current or active tree. This Btree includes a set of hierarchically organized pages 1110A-E. Each page is identified by a KVS key having the form <MID:SID:Page_number>. Thus, as shown in the example of FIG. 11, Btree 1105 has a MID (or logical partition identifier) of 1000 and a SID (or snapshot identifier) of 99. A namespace checking program run on the Btree has indicated that leaf page number 22 (1110E) having KVS key 1000:99:22 is missing or corrupt as shown by the broken lines.

Table C below shows a hierarchy of the Btree to the missing leaf page.

TABLE C

| KVS Key | Description |
| --- | --- |
| 1000:99:0 | root of the Btree |
| 1000:99:1 | first intermediate page |
| 1000:99:2 | second intermediate page |
| 1000:99:10 | third intermediate page |
| 1000:99:22 | leaf page - missing |

Btrees 1115 and 1120 are previous snapshots of the namespace. Specifically, Btree 1115 includes a set of hierarchically organized pages 1125A-E. As discussed, each page is identified by a KVS key having the form <MID:SID:Page_number>. Thus, as shown in the example of FIG. 11, Btree snapshot 1115 has a MID (or logical partition identifier) of 1000 and a SID (or snapshot identifier) of 98. More particularly, the lower snapshot ID value of 98 for tree 1115 as compared to the higher snapshot ID value of 99 for tree 1105 indicates that tree 1115 is a previous or earlier version of the tree that has been captured via a snapshot taken of the tree. For example, consider that Btree 1105 corresponds to a state of the tree at a current time. Btree snapshot 1115 corresponds to a state of the tree at a first time before the current time.

Similarly, Btree 1120 includes a set of hierarchically organized pages 1130A-E. As discussed, each page is identified by a KVS key having the form <MID:SID:Page_number>.

Thus, as shown in the example of FIG. 11, Btree snapshot 1120 has a MID (or logical partition identifier) of 1000 and a SID (or snapshot identifier) of 97. More particularly, the lower snapshot ID value of 97 for tree 1120 as compared to the higher snapshot ID value of 98 for tree 1115 indicates that tree 1120 is a previous or earlier version of the tree that has been captured via a snapshot taken of the tree. For example, consider that Btree 1105 corresponds to a state of the tree at a current time. Btree snapshot 1115 corresponds to a state of the tree at a first time, before the current time, and Btree snapshot 1120 corresponds to a state of the tree at a second time, before the first and current times.

The previous snapshots are searched in reverse chronological order to find a replacement leaf page corresponding to the corrupted (or missing) leaf page (step 1020, FIG. 10). And, upon finding an earlier (non-corrupted) version of the leaf page in a previous snapshot, the corrupted version of the leaf page in the current or active tree is replaced with the earlier (non-corrupted) version of the leaf page (step 1025, FIG. 10).

More particularly, a search is conducted for an earlier version of leaf page 22 by counting backwards from 99 (the current or active version of the tree). Thus, an initial search on the KVS is for KVS key 1000:98:22. The KVS query returns page 1125E.

Page 1125E is inserted into the active Btree (e.g., Mtree) by placing its key (1000:98:22) into intermediate page level-3 1000:99:10.

Btree 1105' shows a state of the tree after insertion of page 1125E. Specifically, missing (or corrupt) leaf page 1110E has been replaced with an earlier, but non-corrupted version of the leaf page, i.e., leaf page 1125E. Btree 1105' may be referred to as a modified Btree. Once an earlier version of the leaf page (e.g., leaf page 1125E) has been inserted into the tree, the namespace checking program or utility is run on the modified Btree.

As discussed, leaf pages store a set of full keys for each file. In an embodiment, each file includes a first full key and a second full key. The first full key references, indexes, or stores an inode of a file. The first full key may be referred to as a CHILD key. The second full key references, indexes, or stores a filename of the file. The second full key may be referred to as a DIRENT key. Given that an older leaf page has been added, there may be file inodes (CHILD keys) without filenames (DIRENT keys) or filenames without file inodes (CHILD keys).

Figure 12:
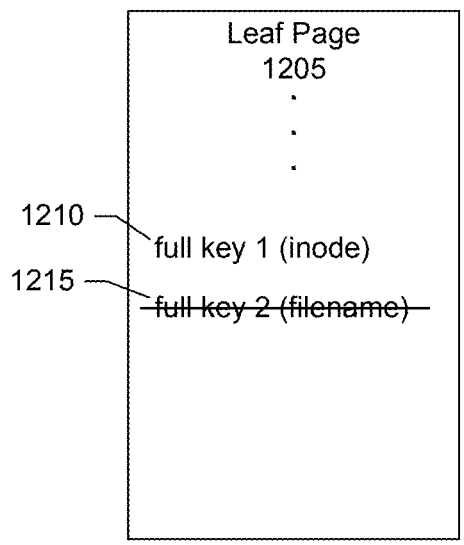
FIG. 12 shows a leaf page having a missing full key to a filename of a file, according to one or more embodiments.
Figure 13:
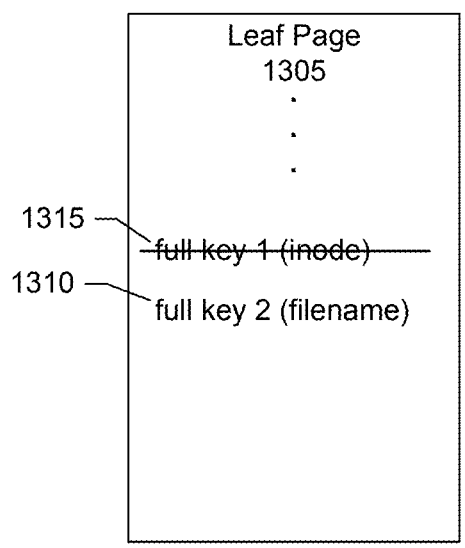
FIG. 13 shows a leaf page having a missing full key to an inode of a file, according to one or more embodiments.

FIG. 12 shows a block diagram of a leaf page 1205 having a first full key (inode) 1210 for a file, but missing a second full key (filename) for the file as indicated by a strikethrough 1215. FIG. 13 shows an alternative scenario where a leaf page 1305 has a second full key (filename) 1310 for a file, but is missing a first full key (inode) for the file as indicated by a strikethrough 1315.

More particularly, once a snapshot of the namespace is taken, there may be a lag, delay, or other interval of time until a next snapshot is taken. The filesystem, however, continues to accept writes throughout the lag and thus make corresponding updates to KVS including adding keys, deleting keys, or both. As a result, the earlier version of the leaf page that has been inserted into the current or active may not necessarily have all the full keys that were at one point present in the corrupt or missing leaf page.

In an embodiment, files that are missing inodes (but not missing filenames) may be placed in a first directory indicating that the files are missing inodes (e.g., "missing_inodes/"). Files that are missing filenames (but not missing inodes) may be placed in a second directory indicating that the files are missing filenames (e.g., "missing_filenames/"). Files with missing filenames may be given placeholder names.

When it is discovered that the older leaf page is missing a first full key (inode) or second full key (filename), the KVS is again queried in an attempt to locate a missing first full key (inode) of a file or a missing second full key (filename) of a file. For example, referring back now to FIG. 10, in a step 1035, a determination may be made that a file has a first full key and is missing a second full key, the file thereby having an inode that has been recovered, but a filename that has not yet been recovered.

In a step 1040, the previous snapshots of the namespace are searched in reverse chronological order to find a leaf page having the second full key.

In a step 1045, upon finding a leaf page having the second full key, an association is made of the file with a filename stored by the second full key. The filename that is recovered may not necessarily be the most recent filename for the file as the filename may have changed since the snapshot. For example, the filename may have been changed from "Q4_results_draft" to "Q4_results_final." The user is likely to appreciate, however, any piece of information that has been recovered.

Alternatively, in a step 1050, a determination may be made that a file has the second full key and is missing the first full key, the file thereby having a filename that has been recovered, but an inode that has not yet been recovered.

In a step 1055, the previous snapshots of the namespace are searched in reverse chronological order to find a leaf page having the first full key.

In a step 1060, upon finding a leaf page having the first full key, an association is made of the file with an inode stored by the first full key. The inode that is recovered may not necessarily be the most recent inode for the file as the inode or, more particularly, information stored by the inode may have changed since the snapshot. For example, file data or other data segments referenced by the inode may have been updated. Again, the user is nonetheless likely to appreciate any piece of information that has been recovered.

Figure 14:
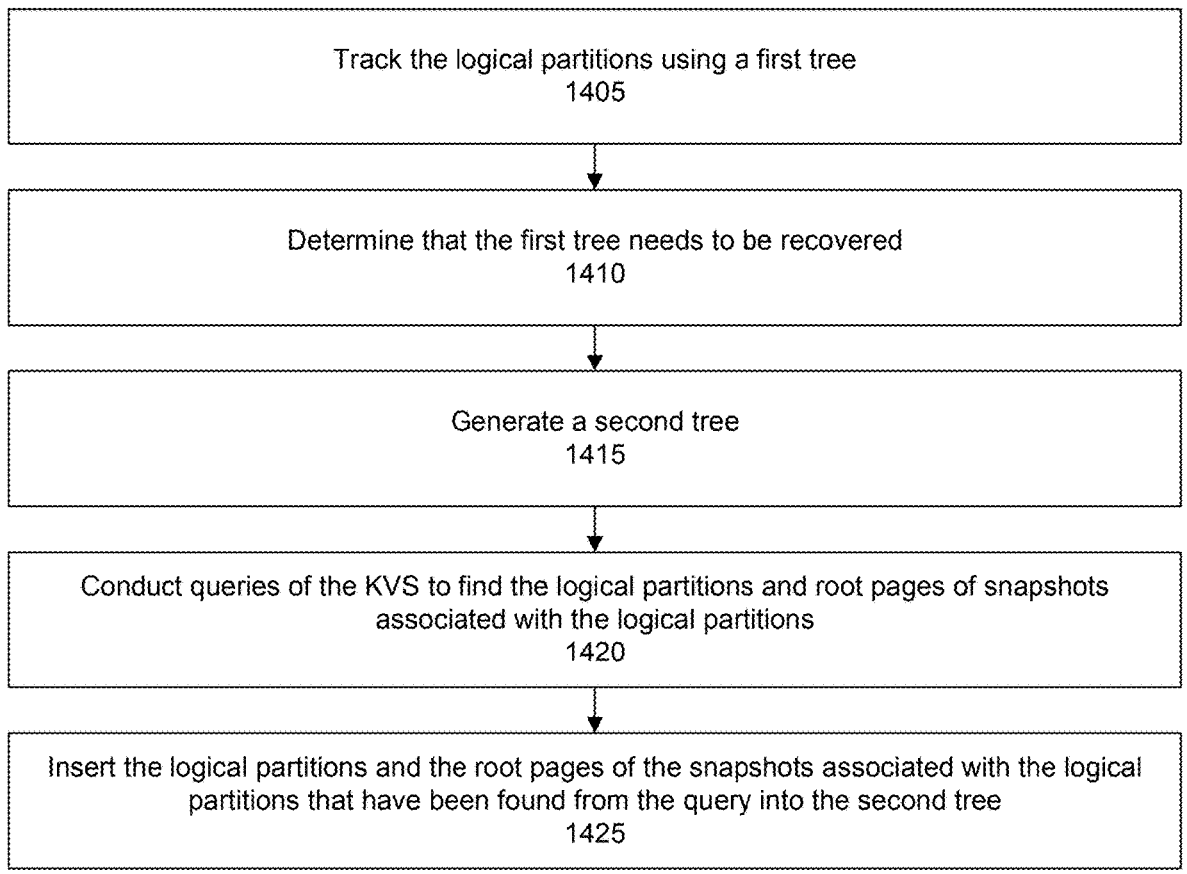
FIG. 14 shows a flow for recovering a Utree, according to one or more embodiments.

FIG. 14 shows a flow for recovering a Utree. As discussed, in an embodiment, the logical partitions are themselves tracked by a tree data structure. This tree data structure may itself suffer a corruption. More particularly, in a step 1405, a set of logical partitions are tracked using a first tree. In a step 1410, a determination is made that the first tree needs to be recovered. For example, a namespace checking utility run on the first tree may have returned a result indicating corruption.

In a step 1415, a second tree is generated. In a step 1420, queries of the KVS are conducted to find the logical partitions and root pages of snapshots associated with the logical partitions.

In a step 1425, the logical partitions and the root pages associated with the logical partitions that have been found from the query are inserted into the second tree.

Figure 15:
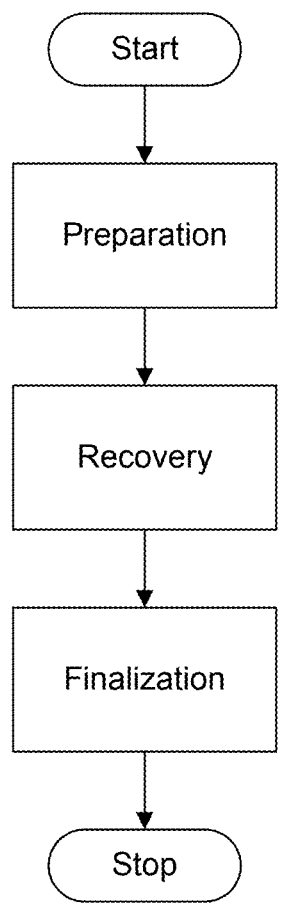
FIG. 15 shows a flow of a recovery procedure, according to one or more embodiments.

In an embodiment, recovery proceeds in three phases: 1) preparation, 2) recovery, and 3) finalization. FIG. 15 shows a flow of the recovery procedure phases. There is a preparation phase 1505, followed by a recovery phase 1510, followed by a finalization phase 1515.

Preparation Phase

In the Preparation Phase, recovery policies are collected and the KVS pages are searched to assess their state and to assemble lists that will drive the recovery phase. The following lists are created:

1. The Recovery List: This comes as external input and is a list of B+ Trees that will be recovered.
2. A Root Page List is produced from a wildcard search of the KVS Page Table with a "<*;*;0>" search string. This list will contain the root page of the active Utree, all Mtrees, and their snapshots. Utree root pages are maintained internally in a separate Utree List as a convenience.
3. The Page MID List: This is a sorted list of unique Mtree IDs (MID) discovered in the Page Table from building the root page list.
4. The Root Inode List: This is a list of Inodes to the root directory ("/").
5. The Inode MID List: This is a sorted list of unique Mtree IDs (MID) discovered in the root inode list.
6. The Missing B+ Tree List contains MIDs from the Inode MID List that are not in the B+ Tree MID List. This is the case where leaf pages for an Mtree exist, but no Mtree root page can be found.

At the end of this phase, for each of the B+ Trees that are recovered the state of the recovery process is known—whether it is a Utree recovery, an Mtree recovery, or a recovery of the same where the B+ Tree root page is missing, or where no recovery is possible for the specified B+ Tree. Once all the B+ Trees that can be recovered have been recovered, the recovery phase is complete.

Table D below shows an example of the preparation phase with some sample data.

TABLE D

| Step | Description |
|---|---|
| 1 | Get Recovery List: Assume the user has specified a recovery list as including MID = 1000, and all its snapshots. A list structure is constructed internally to be used later in the process. |
| 2 | Construct the Root Page List: A wildcard search of <*:*:0) in the KVS page table yields a list of pages including 990:16:0 and 1000:97:0, 1000:98:0, 1000:99:0 and these are all put the Root Page List. The Utree list is populated with 990:16:0, but assume for the case of this example that page is corrupted and therefore the Utree is corrupted. |
| 3 | Construct the Page MID List: In this example there is a single item in the list MID = 1000. |
| 4 | Construct the Root Inode List: The KVS inode table is searched for <1000:16:*> and two entries are found: <1000:16:80> and <1000:16:98>. These are the inodes for the "/" directory—the root directory, for which all subdirectories and files descend. |

TABLE D-continued

| Step | Description |
|---|---|
| 5 | Construct The Inode MID List: This is a sorted list of unique Mtree IDs (MID) discovered in the root inode list. With this we have just one entry "MID = 1000", and it matches the "MID = 1000", therefore there are no missing Mtree's in the Btree table. |
| 6 | Construct the Missing B+ Tree List: It contains MIDs from the Inode MID List that are not in the B+ Tree MID List. This is the case where leaf pages for an Mtree exist, but no Mtree root page can be found. This list is empty so we have therefore no missing Mtrees, based on comparing with the Inode MID list. |

Figure 16:
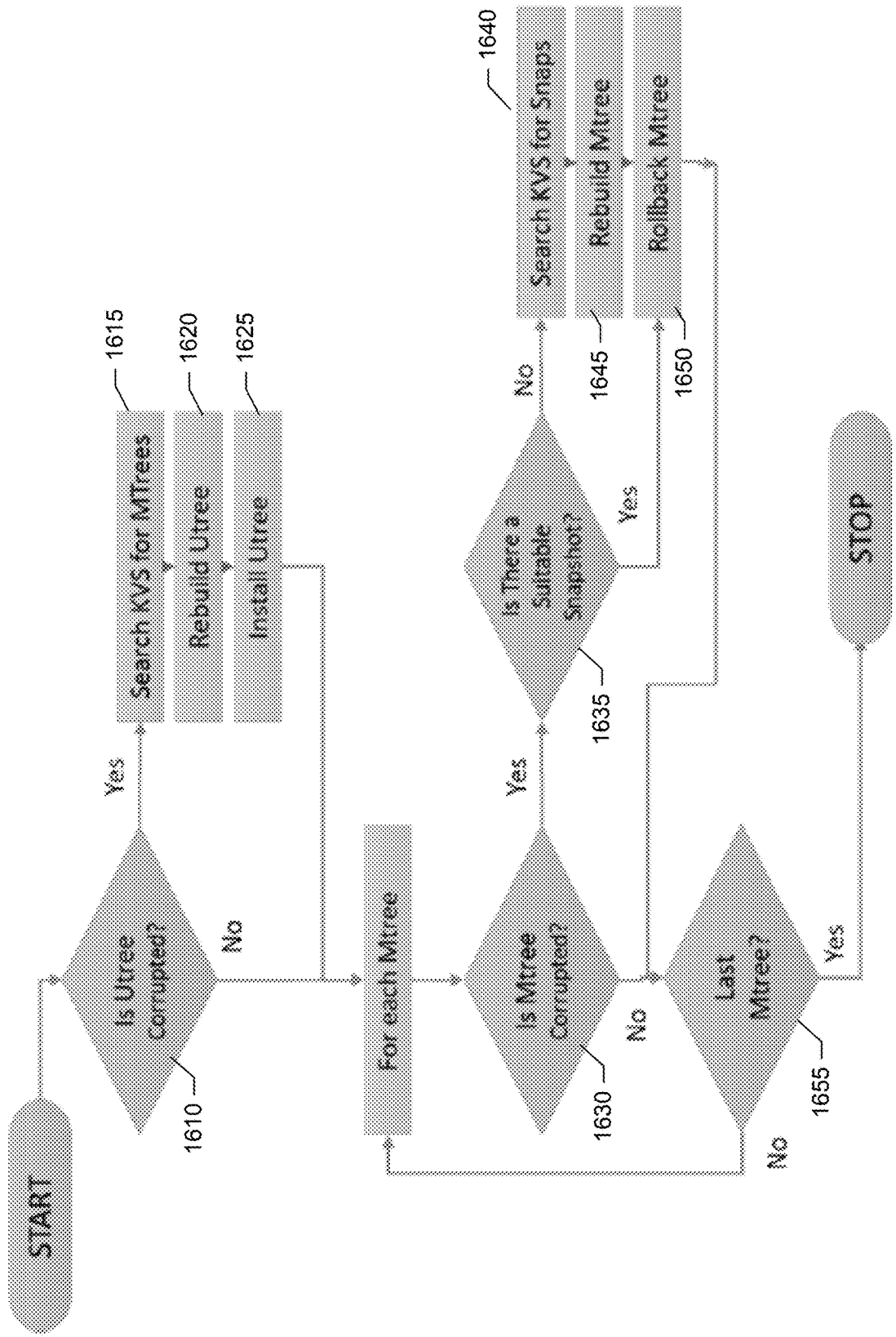
FIG. 16 shows an example of a general recovery flow, according to one or more embodiments.

FIG. 16 shows a recovery flow in further detail. In a step 1610, a determination is made as to whether a Utree is corrupted. If the Utree is corrupted, the KVS is searched for Mtrees (step 1615). In a step 1620, the Utree is rebuilt using the Mtrees. In a step 1625, the Utree is installed.

For each Mtree, in a step 1630, a determination is made as to whether an Mtree is corrupted. Assuming a corrupted Mtree, a determination is made as to whether there is a suitable snapshot (step 1635). If there is not a suitable snapshot, a search of the KVS is conducted for snapshots (step 1640). A snapshot may not be suitable when the snapshot or a portion of the snapshot is corrupted. A snapshot may not be suitable when the snapshot, based on a user supplied date, is too old. For example, as part of the input criteria to recovering a namespace, the user may specify a date or date range that limits the searching of snapshots to within the specified date range. In a step 1645, the Mtree is rebuilt from results returned from the search of the KVS. In a step 1650, the Mtree is then rolled back. Steps 1630-1650 are repeated until the last Mtree has been examined and rebuilt if needed (step 1655).

Utree Reconstruction

If a new Utree is required, it is created from scratch and the populated with all the good Mtrees and snapshot from the information available. In an embodiment, Utree reconstruction proceeds as follows:

1. For each MID in the Mtree MID List:
2. If the active B+ Tree can be determined at the time of corruption, install it in the Draft Utree as the active B+ Tree for that Mtree, and install the rest of the B+ Trees for the MID as snapshots. If not, add the Mtree <MID: 0> to the recovery list to recover an active Mtree.
3. The proper multilevel structure of the Draft Utree will automatically form as each Mtree element is added to its structure.
4. Check the resulting Utree and if correct write it to persistent storage.

Table E below shows an example of the Utree reconstruction with some sample data.

TABLE E

| Step | Description |
|---|---|
| 1 | Reference root-page list: It is creating by doing a wild card search on <*:*:0>. This will find all the Mtree and snapshot root pages. |
| 2 | Assume the root-page list contains 1000:99:0, 1000:98:0, 1000:97:0 |
| 3 | This means we have one Mtree with MID = 1000, with the active tree having SID = 99, and snapshots with SID = 97 and SID = 98. |
| 4 | Create Utree with a single Mtree, MID = 1000. A fresh Utree is constructed and is populated with the Mtree and its snapshots. |

Mtree Recovery

During Mtree recovery, the lost and found directory will have defective files placed in one of two subdirectories as shown in Table F below.

TABLE F

| Directory | Subdirectory | Purpose |
|---|---|---|
| lost + found/ | missing_inodes/ | Files with names but no or not the correct inode. |
| lost + found/ | missing_filenames/ | Inodes where the filename was lost. |

Mtree Recovery

The B+ Tree recovery list will contain the failed Mtrees from Utree recovery and any from the Missing B+ Tree list. All items in this list are recovery candidates. Active Mtree recovery is the focus of this operation, but snapshots can be recovered as well, and it may be more suitable to do a rollback, making a snapshot the starting point of the active Mtree. Below is a flow for an Mtree recovery, according to one or more embodiments.

1. Btree pages are stored with the key <MID, SID, page_number>, inode keys are stored as <MID, SID, inode_number>.
2. Iterating through all the KVS entries identifies all the mtrees—by looking for unique MIDs—if at least one key was present in KVS.
3. For all the Mtrees identified, iterating for <MID,SID> combination identifies all snapshots for the mtrees—if at least one key was present in KVS.
4. With the above information, iterating through the KVS to collect the corresponding <MID, SID, X> keys for a given Mtree snapshot identifies all pages for that <Mtree, Snapshot>.
5. If we iterate the above list and filter only the leaf pages out, we can create a Btree with all the leaf pages present in the KVS.
6. Missing leaf pages can be pulled from a previous snapshot, if it exists.
7. Even if only one leaf page of a <MID,SID> is visible in KVS, a btree can be created out of it.
8. Root pages can be created from scratch with default information. Intermediate pages will naturally form as recovered leaf pages are added to the tree.

Finalization Phase

The filesystem is checked and placed into service, and the steps to reduce lost and found directory size commences.

Restoring Filenames, File Inodes, and Directory Structures

Inodes and filenames that were recovered in the previous recovery steps are placed in subdirectories of the lost and found directory. Restoring inodes to files without inodes, and names to files without proper filenames will be done next, placing those results in the following new subdirectories as shown in Table G below. Users may then peruse those restored files and move them manually or by script to their original locations.

TABLE G

| Directory | Subdirectory | Purpose |
|---|---|---|
| lost + found/ | found_inodes/ | Files with names where the inode has been recovered. |
| lost + found/ | found_filenames/ | Inodes where the filename was recovered. |

For convenience, in an embodiment, an in-core found directory list is used to cache recovered directory names as the full path to files is discovered.

Recovering Lost Filenames

If the lost+found/missing_inodes or lost+found/missing_filenames directory are
not empty, there is more work to do. To deal with entries in the missing_filenames directory the following procedure is followed:
1. For each file/inode in the lost+found directory, determine its <MID:SID:CID>.
2. Create a search KVS search key for the Page Table of the type <MID:SID:*>. The results contain the keys for all Btree pages for that MID and filter only for leaf pages.
3. For each leaf, search them for the corresponding CHILD full key. A binary search can be used, assuming the page keys were returned in sorted order.
4. If no leaf page is found, go to step number 2 with SID-1 (searching for earlier versions of the pages).
5. With the CHILD full key found, we will have a match of the type <PID:CID>, where PID is the parent directory for this inode. The child full-key value will also have a "dm_dirent_t" structure, which contains the <PID:CID> of the file's primary DIRENT.
6. Search for the DIRENT using KVS page queries, as noted above in step number 2. If found, this will contain the files' names. If not found, we can search for the BLINK full key (see below) corresponding to this inode to find an active DIRENT.
7. With the filename determined, check the found directory list to see if the file's PID is a directory we have already created. If not, create a directory with the PID in the found_filenames directory. Rename the original lost+found/lost_file name to its recovered parent directory name in the found_filenames directory.

Use of BLINK Full Key for File Name Recovery

Figure 17:
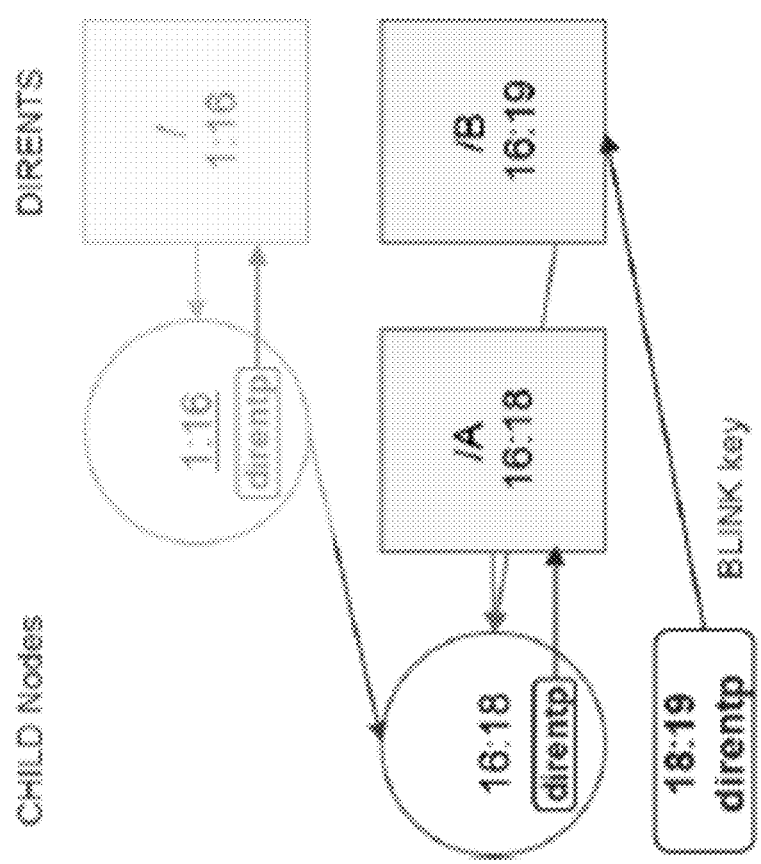
FIG. 17 shows an example of using a BLINK key to reference additional filenames after a hard-link operation, according to one or more embodiments.

The BLINK full key can recover filenames for files renamed or with multiple names (i.e., hard links). In the example shown in FIG. 17, a hard link is made from/A to a new file/B, giving the original files two names. The backlink from the inode to the second file is recorded in a BLINK key and can be used for filename recovery for both hard links and file renames, which uses the same mechanism.

Restoring Full Path Names

The found_filenames directory contains one or more subdirectories named "recovered_directory _<CID>," where CID is the PID of the files in that directory. From here, a bottom-up recovery algorithm is followed to rebuild the original full pathnames of those directories.
The process proceeds as follows:
1. For each recovered_directory_<CID>, reference the found_directory_list to determine the range of SIDs of the files in that directory.
2. Create KVS search keys of the form <MID:SID:*>where SID is each file's lowest SID and proceed to the most recent (highest) SID.
3. For each leaf page found, search for a directory DIRENT with this CID. Select the newest one—this is the name of our directory, and it also contains its PID. Rename the directory to that name and update the found directory list.
4. If the PID is sixteen, that is the directory "/", then we have reached the top of the hierarchy. Go back to step number 1 and select another recovered directory.
5. Otherwise, create a new temporary parent directory with PID as its name and make the directory we are working on a subdirectory of this newly created higher-level directory.
6. Go to step 1.

Recovering Missing File Inodes

The/lost+found/missing_inodes directory contains files that point to a non-existent inode. For expediting this process files in this directory are symbolic links to the original file in its original location, and all operations will be performed on the original file.
Below is a flow for the recovery process, according to one or more embodiments.
1. Search all the earlier leaf pages snapshots that has that page and select the one with the highest SID (i.e., the newest available inode) to fill in for the missing inode. This step may result in the loss of recent writes to this file.
2. Move the recovered entry to the found_inodes directory.

After recovery users are expected to review their recovered files for correctness carefully and will be aware of the nature of this process. This recovery procedure yields a high customer benefit from the available data for recovery.

In an embodiment, there is a method of namespace recovery for key-value store (KVS)-persisted metadata of a filesystem comprising: forming page keys in the KVS, the page keys identifying pages of trees within which namespaces of logical partitions of the filesystem are held, the pages including leaf pages comprising first and second full keys associated with each file of a file set, the first full keys indexing inodes for files in the file set, and the second full keys indexing filenames for the files; forming inode keys in the KVS, the inode keys identifying inodes of the files; embedding some of the metadata into the page and inode keys, each page key comprising an identifier of a logical partition, an identifier of a snapshot taken of a namespace of the logical partition, and a page number to a page in a tree holding the namespace, and each inode key comprising the logical partition identifier, the snapshot identifier, and an inode number of an inode to a file in the file set; upon damage to the namespace, conducting queries of the KVS using the page and inode keys; and recovering the namespace based on results returned from the queries.

The method may include: searching, in reverse chronological order, previous snapshots of the namespace in the KVS to find a replacement for a leaf page in the tree that is corrupt; and upon finding an earlier version of the leaf page in a previous snapshot, inserting the earlier version of the leaf page into the tree holding the namespace, the earlier version of the leaf page now being a recovered leaf page.

The method may include: checking the recovered leaf page for any files missing first full keys or second full keys; determining that a file has a first full key and is missing a second full key, the file thereby being a file having an inode that has been recovered, but a filename that has not yet been recovered; searching, in reverse chronological order, the previous snapshots of the namespace in the KVS to find a leaf page having the second full key; and upon finding the leaf page having the second full key, associating the file with a filename indexed by the second full key.

The method may include: checking the recovered leaf page for any files missing first full keys or second full keys; determining that a file has a second full key and is missing a first full key, the file thereby being a file having a filename that has been recovered, but an inode that has not yet been recovered; searching, in reverse chronological order, the previous snapshots of the namespace in the KVS to find a leaf page having the first full key; and upon finding the leaf page having the first full key, associating the file with an inode indexed by the first full key.

The method may include: tracking the logical partitions using a first tree; determining that the first tree needs to be recovered; generating a second tree; querying the KVS to find the logical partitions and root pages of snapshots associated with the logical partitions; and inserting the logical partitions and the root pages of the snapshots associated with the logical partitions that have been found from the query into the second tree.

The method may include: receiving, responsive to the queries of the KVS, a leaf page from a previous snapshot of the namespace, the leaf page corresponding to a current leaf page of the tree holding the namespace that has become corrupted, the leaf page being an older, but non-corrupted version of the leaf page; inserting the leaf page into the tree to replace the current leaf page that has become corrupted; checking the leaf page for any files missing first or second full keys, a file having a first full key and missing a second full key thereby being a file having an inode that has been recovered, but a filename that has not yet been recovered, and a file having the second full key and missing the first full key thereby being a file having a filename that has been recovered, but an inode that has not yet been recovered; determining from the checking that a particular file is missing one of the first or second full keys; querying the KVS to find another leaf page in the previous snapshot or other previous snapshots of the namespace that has the missing one of the first or second full keys; upon finding the missing one of the first or second full keys, associating a value indexed by the now found first or second full key to the particular file, the value thereby being one of the inode or filename of the particular file.

In another embodiment, there is a system for namespace recovery for key-value store (KVS)-persisted metadata of a filesystem comprising: a processor; and memory configured to store one or more sequences of instructions which, when executed by the processor, cause the processor to carry out the steps of: forming page keys in the KVS, the page keys identifying pages of trees within which namespaces of logical partitions of the filesystem are held, the pages including leaf pages comprising first and second full keys associated with each file of a file set, the first full keys indexing inodes for files in the file set, and the second full keys indexing filenames for the files; forming inode keys in the KVS, the inode keys identifying inodes of the files; embedding some of the metadata into the page and inode keys, each page key comprising an identifier of a logical partition, an identifier of a snapshot taken of a namespace of the logical partition, and a page number to a page in a tree holding the namespace, and each inode key comprising the logical partition identifier, the snapshot identifier, and an inode number of an inode to a file in the file set; upon damage to the namespace, conducting queries of the KVS using the page and inode keys; and recovering the namespace based on results returned from the queries.

In another embodiment, there is a computer program product, comprising a non-transitory computer-readable medium having a computer-readable program code embodied therein, the computer-readable program code adapted to be executed by one or more processors to implement a method of namespace recovery for key-value store (KVS)-persisted metadata of a filesystem comprising: forming page keys in the KVS, the page keys identifying pages of trees within which namespaces of logical partitions of the filesystem are held, the pages including leaf pages comprising first and second full keys associated with each file of a file set, the first full keys indexing inodes for files in the file set, and the second full keys indexing filenames for the files; forming inode keys in the KVS, the inode keys identifying inodes of the files; embedding some of the metadata into the page and inode keys, each page key comprising an identifier of a logical partition, an identifier of a snapshot taken of a namespace of the logical partition, and a page number to a page in a tree holding the namespace, and each inode key comprising the logical partition identifier, the snapshot identifier, and an inode number of an inode to a file in the file set; upon damage to the namespace, conducting queries of the KVS using the page and inode keys; and recovering the namespace based on results returned from the queries.

In another embodiment, there is a method of namespace recovery for key-value store (KVS)-persisted metadata of a filesystem partitioned into logical partitions comprising: forming page keys in the KVS, the page keys identifying pages of trees within which namespaces of the logical partitions are held, the pages including leaf pages comprising first and second full keys associated with each file of a file set, the first full keys storing inodes for the files in the file set, and the second full keys storing filenames for the files in the file set; forming inode keys in the KVS, the inode keys identifying inodes of the files in the file set; embedding some of the metadata into the page keys and inode keys, each page key comprising an identifier of a logical partition, an identifier of a snapshot taken of a namespace of the logical partition, and a page number to a page in a tree holding the namespace, and each inode key comprising the logical partition identifier, the snapshot identifier, and an inode number of an inode to a file in the file set; determining that the namespace has been damaged because the tree holding the namespace is missing a leaf page; conducting queries of the KVS to recover the namespace comprising: searching, in reverse chronological order, previous snapshots of the namespace to find the missing leaf page; upon finding an earlier version of the missing leaf page in a previous snapshot, inserting the earlier version of the missing leaf page into the tree holding the namespace, the earlier version of missing leaf page now being a recovered leaf page; checking the recovered leaf page for any files missing first full keys or second full keys, a file having a first full key and missing a second full key thereby being a file having an inode that has been recovered, but a filename that has not yet been recovered, and a file having a second full key and missing a first full key thereby being a file having a filename that has been recovered, but an inode that has not yet been recovered; for the file having the first full key and missing the second full key, searching, in reverse chronological order, the previous snapshots of the namespace to find a leaf page having the missing second full key; and upon finding the leaf page having the missing second full key, associating the file with a filename stored by the missing second full key; for the files having the second full key and missing the first full key, searching, in reverse chronological order, the previous snapshots of the namespace to find a leaf page having the missing first full key; and upon finding the leaf page having the missing first full key, associating the file with an inode stored by the missing first full key.

In another embodiment, there is a method comprising: storing a namespace of a filesystem in a key-value store (KVS), the KVS comprising a page table referencing pages of a B+ tree holding the namespace, and an inode table referencing inodes of files in the filesystem; naming page keys in the page table by including with each page key an identifier of a logical partition of the filesystem, an identifier of a snapshot of a namespace of the logical partition, and a page number of the B+ tree; naming inode keys in the inode table by including with each inode key the logical partition identifier, the snapshot identifier, and an inode number to a file; upon a determination that recovery is needed on the namespace, querying the KVS using the page and inode keys to retrieve items stored in the KVS; and rebuilding the namespace using the items retrieved in response to the queries.

The items may include a page from a previous snapshot of the namespace. The items may include a key stored on a page from a previous snapshot of the namespace, the key indexing an inode of a file. The items may include a key stored on a page from a previous snapshot of the namespace, the key indexing a filename of a file.

Referring back now to FIG. 1A, the clients may include servers, desktop computers, laptops, tablets, smartphones, internet of things (IoT) devices, or combinations of these. The data protection backup storage system receives requests from the clients, performs processing required to satisfy the requests, and forwards the results corresponding to the requests back to the requesting client system. The processing required to satisfy the request may be performed by the data protection storage appliance or may alternatively be delegated to other servers connected to the network.

The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage system connected to the data protection server may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

Figure 18:
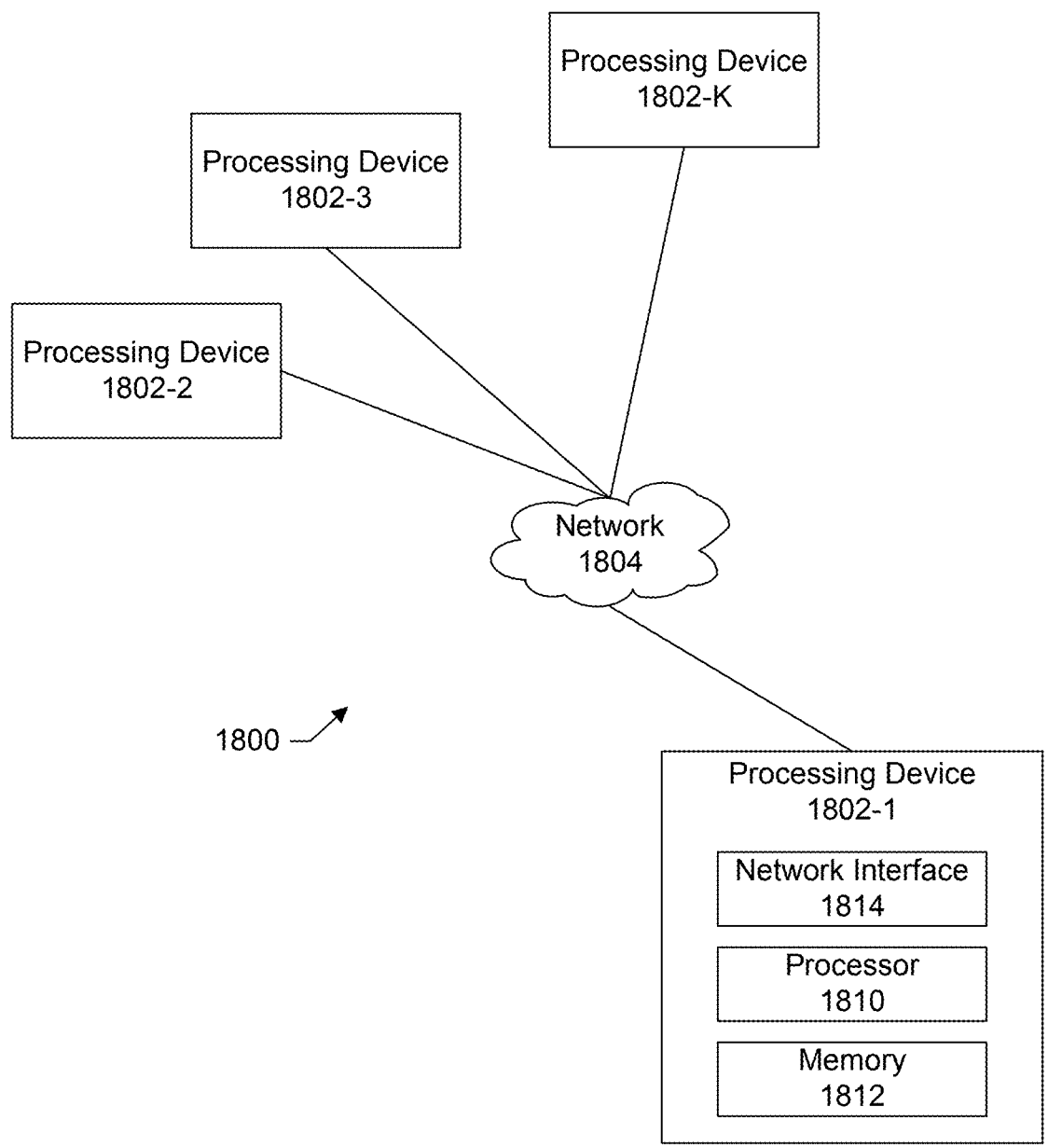
FIG. 18 shows a block diagram of a processing platform that may be utilized to implement at least a portion of an information processing system, according to one or more embodiments.

FIG. 18 shows an example of a processing platform 1800 that may include at least a portion of the information handling system shown in FIG. 1A. The example shown in FIG. 18 includes a plurality of processing devices, denoted 1802-1, 1802-2, 1802-3, . . . 1802-K, which communicate with one another over a network 1804.

The network 1804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1802-1 in the processing platform 1800 comprises a processor 1810 coupled to a memory 1812.

The processor 1810 may comprise a microprocessor, a microcontroller, an application-specific integrated circuit (ASIC), a field-programmable gate array (FPGA) or other type of processing circuitry, as well as portions or combinations of such circuitry elements.

The memory 1812 may comprise random access memory (RAM), read-only memory (ROM) or other types of memory, in any combination. The memory 1812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1802-1 is network interface circuitry 1814, which is used to interface the processing device with the network 1804 and other system components, and may comprise conventional transceivers.

The other processing devices 1802 of the processing platform 1800 are assumed to be configured in a manner similar to that shown for processing device 1802-1 in the figure.

Again, the particular processing platform 1800 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 19:
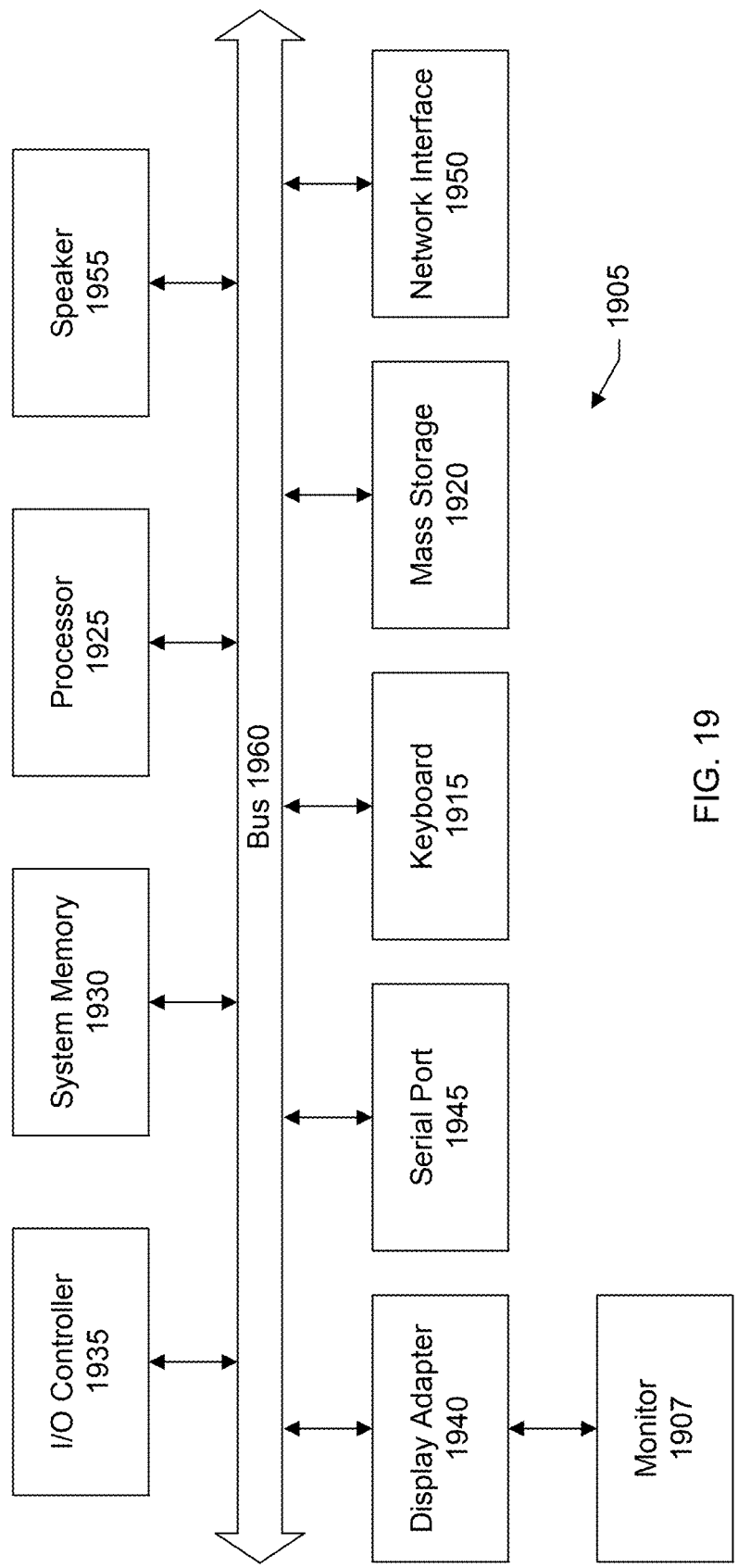
FIG. 19 shows a block diagram of a computer system suitable for use with the system, according to one or more embodiments.

FIG. 19 shows a system block diagram of a computer system 1905 used to execute the software of the present system described herein. The computer system includes a monitor 1907, keyboard 1915, and mass storage devices 1920. Computer system 1905 further includes subsystems such as central processor 1925, system memory 1930, input/output (I/O) controller 1935, display adapter 1940, serial or universal serial bus (USB) port 1945, network interface 1950, and speaker 1955. The system may also be used with computer systems with additional or fewer subsystems. For example, a computer system could include more than one processor 1925 (i.e., a multiprocessor system) or a system may include a cache memory.

Arrows such as 1960 represent the system bus architecture of computer system 1905. However, these arrows are illustrative of any interconnection scheme serving to link the subsystems. For example, speaker 1955 could be connected to the other subsystems through a port or have an internal direct connection to central processor 1925. The processor may include multiple processors or a multicore processor, which may permit parallel processing of information. Computer system 1905 shown in FIG. 19 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows® family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks, components, and modules shown in the figures may be functional and there can be many different hardware configurations, software configurations, or both to implement the functions described.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of namespace recovery for key-value store (KVS)-persisted metadata of a filesystem comprising:
    forming page keys in the KVS, the page keys identifying pages of trees within which namespaces of logical partitions of the filesystem are held, the pages including leaf pages comprising first and second full keys associated with each file of a file set, the first full keys indexing inodes for files in the file set, and the second full keys indexing filenames for the files;
    forming inode keys in the KVS, the inode keys identifying inodes of the files;
    embedding some of the metadata into the page and inode keys, each page key comprising an identifier of a logical partition, an identifier of a snapshot taken of a namespace of the logical partition, and a page number to a page in a tree holding the namespace, and each inode key comprising the logical partition identifier, the snapshot identifier, and an inode number of an inode to a file in the file set;
    upon damage to the namespace, conducting queries of the KVS using the page and inode keys; and
    recovering the namespace based on results returned from the queries.

2. The method of claim 1 further comprising:
    searching, in reverse chronological order, previous snapshots of the namespace in the KVS to find a replacement for a leaf page in the tree that is corrupt; and
    upon finding an earlier version of the leaf page in a previous snapshot, inserting the earlier version of the leaf page into the tree holding the namespace, the earlier version of the leaf page now being a recovered leaf page.

3. The method of claim 2 further comprising:
    checking the recovered leaf page for any files missing first full keys or second full keys;
    determining that a file has a first full key and is missing a second full key, the file thereby being a file having an inode that has been recovered, but a filename that has not yet been recovered;
    searching, in reverse chronological order, the previous snapshots of the namespace in the KVS to find a leaf page having the second full key; and
    upon finding the leaf page having the second full key, associating the file with a filename indexed by the second full key.

4. The method of claim 2 further comprising:
    checking the recovered leaf page for any files missing first full keys or second full keys;
    determining that a file has a second full key and is missing a first full key, the file thereby being a file having a filename that has been recovered, but an inode that has not yet been recovered;
    searching, in reverse chronological order, the previous snapshots of the namespace in the KVS to find a leaf page having the first full key; and
    upon finding the leaf page having the first full key, associating the file with an inode indexed by the first full key.

5. The method of claim 1 further comprising:
    tracking the logical partitions using a first tree;
    determining that the first tree needs to be recovered;
    generating a second tree;
    querying the KVS to find the logical partitions and root pages of snapshots associated with the logical partitions; and
    inserting the logical partitions and the root pages of the snapshots associated with the logical partitions that have been found from the query into the second tree.

6. The method of claim 1 further comprising:
    receiving, responsive to the queries of the KVS, a leaf page from a previous snapshot of the namespace, the leaf page corresponding to a current leaf page of the tree holding the namespace that has become corrupted, the leaf page being an older, but non-corrupted version of the leaf page;
    inserting the leaf page into the tree to replace the current leaf page that has become corrupted;
    checking the leaf page for any files missing first or second full keys, a file having a first full key and missing a second full key thereby being a file having an inode that has been recovered, but a filename that has not yet been recovered, and
    a file having the second full key and missing the first full key thereby being a file having a filename that has been recovered, but an inode that has not yet been recovered;
    determining from the checking that a particular file is missing one of the first or second full keys;
    querying the KVS to find another leaf page in the previous snapshot or other previous snapshots of the namespace that has the missing one of the first or second full keys; and upon finding the missing one of the first or second full keys, associating a value indexed by a now found first or second full key to the particular file, the value thereby being one of the inode or filename of the particular file.

7. A system for namespace recovery for key-value store (KVS)-persisted metadata of a filesystem comprising: a processor; and memory configured to store one or more sequences of instructions which, when executed by the processor, cause the processor to carry out steps comprising:
forming page keys in the KVS, the page keys identifying pages of trees within which namespaces of logical partitions of the filesystem are held, the pages including leaf pages comprising first and second full keys associated with each file of a file set, the first full keys indexing inodes for files in the file set, and the second full keys indexing filenames for the files;
forming inode keys in the KVS, the inode keys identifying inodes of the files;
embedding some of the metadata into the page and inode keys, each page key comprising an identifier of a logical partition, an identifier of a snapshot taken of a namespace of the logical partition, and a page number to a page in a tree holding the namespace, and each inode key comprising the logical partition identifier, the snapshot identifier, and an inode number of an inode to a file in the file set;
upon damage to the namespace, conducting queries of the KVS using the page and inode keys; and
recovering the namespace based on results returned from the queries.

8. The system of claim 7 wherein the processor further carries out the steps of:
searching, in reverse chronological order, previous snapshots of the namespace in the KVS to find a replacement for a leaf page in the tree that is corrupt; and
upon finding an earlier version of the leaf page in a previous snapshot, inserting the earlier version of the leaf page into the tree holding the namespace, the earlier version of the leaf page now being a recovered leaf page.

9. The system of claim 8 wherein the processor further carries out the steps of:
checking the recovered leaf page for any files missing first full keys or second full keys;
determining that a file has a first full key and is missing a second full key, the file thereby being a file having an inode that has been recovered, but a filename that has not yet been recovered;
searching, in reverse chronological order, the previous snapshots of the namespace in the KVS to find a leaf page having the second full key; and
upon finding the leaf page having the second full key, associating the file with a filename indexed by the second full key.

10. The system of claim 8 wherein the processor further carries out the steps of:
checking the recovered leaf page for any files missing first full keys or second full keys;
determining that a file has a second full key and is missing a first full key, the file thereby being a file having a filename that has been recovered, but an inode that has not yet been recovered;
searching, in reverse chronological order, the previous snapshots of the namespace in the KVS to find a leaf page having the first full key; and
upon finding the leaf page having the first full key, associating the file with an inode indexed by the first full key.

11. The system of claim 7 wherein the processor further carries out the steps of:
tracking the logical partitions using a first tree;
determining that the first tree needs to be recovered;
generating a second tree;
querying the KVS to find the logical partitions and root pages of snapshots associated with the logical partitions; and
inserting the logical partitions and the root pages of the snapshots associated with the logical partitions that have been found from the query into the second tree.

12. The system of claim 7 wherein the processor further carries out the steps of:
receiving, responsive to the queries of the KVS, a leaf page from a previous snapshot of the namespace, the leaf page corresponding to a current leaf page of the tree holding the namespace that has become corrupted, the leaf page being an older, but non-corrupted version of the leaf page;
inserting the leaf page into the tree to replace the current leaf page that has become corrupted;
checking the leaf page for any files missing first or second full keys, a file having a first full key and missing a second full key thereby being a file having an inode that has been recovered, but a filename that has not yet been recovered, and
a file having the second full key and missing the first full key thereby being a file having a filename that has been recovered, but an inode that has not yet been recovered;
determining from the checking that a particular file is missing one of the first or second full keys;
querying the KVS to find another leaf page in the previous snapshot or other previous snapshots of the namespace that has the missing one of the first or second full keys; and
upon finding the missing one of the first or second full keys, associating a value indexed by a now found first or second full key to the particular file, the value thereby being one of the inode or filename of the particular file.

13. A computer program product, comprising a non-transitory computer-readable medium having a computer-readable program code embodied therein, the computer-readable program code adapted to be executed by one or more processors to implement a method of namespace recovery for key-value store (KVS)-persisted metadata of a filesystem comprising:
forming page keys in the KVS, the page keys identifying pages of trees within which namespaces of logical partitions of the filesystem are held, the pages including leaf pages comprising first and second full keys associated with each file of a file set, the first full keys indexing inodes for files in the file set, and the second full keys indexing filenames for the files;
forming inode keys in the KVS, the inode keys identifying inodes of the files;
embedding some of the metadata into the page and inode keys, each page key comprising an identifier of a logical partition, an identifier of a snapshot taken of a namespace of the logical partition, and a page number to a page in a tree holding the namespace, and each inode key comprising the logical partition identifier, the snapshot identifier, and an inode number of an inode to a file in the file set;

upon damage to the namespace, conducting queries of the KVS using the page and inode keys; and recovering the namespace based on results returned from the queries.

14. The computer program product of claim 13 wherein the method further comprises:

searching, in reverse chronological order, previous snapshots of the namespace in the KVS to find a replacement for a leaf page in the tree that is corrupt; and upon finding an earlier version of the leaf page in a previous snapshot, inserting the earlier version of the leaf page into the tree holding the namespace, the earlier version of the leaf page now being a recovered leaf page.

15. The computer program product of claim 14 wherein the method further comprises:

checking the recovered leaf page for any files missing first full keys or second full keys;

determining that a file has a first full key and is missing a second full key, the file thereby being a file having an inode that has been recovered, but a filename that has not yet been recovered;

searching, in reverse chronological order, the previous snapshots of the namespace in the KVS to find a leaf page having the second full key; and upon finding the leaf page having the second full key, associating the file with a filename indexed by the second full key.

16. The computer program product of claim 14 wherein the method further comprises:

checking the recovered leaf page for any files missing first full keys or second full keys;

determining that a file has a second full key and is missing a first full key, the file thereby being a file having a filename that has been recovered, but an inode that has not yet been recovered;

searching, in reverse chronological order, the previous snapshots of the namespace in the KVS to find a leaf page having the first full key; and upon finding the leaf page having the first full key, associating the file with an inode indexed by the first full key.

17. The computer program product of claim 13 wherein the method further comprises:

tracking the logical partitions using a first tree;

determining that the first tree needs to be recovered;

generating a second tree;

querying the KVS to find the logical partitions and root pages of snapshots associated with the logical partitions; and inserting the logical partitions and the root pages of the snapshots associated with the logical partitions that have been found from the query into the second tree.

18. The computer program product of claim 13 wherein the method further comprises:

receiving, responsive to the queries of the KVS, a leaf page from a previous snapshot of the namespace, the leaf page corresponding to a current leaf page of the tree holding the namespace that has become corrupted, the leaf page being an older, but non-corrupted version of the leaf page;

inserting the leaf page into the tree to replace the current leaf page that has become corrupted;

checking the leaf page for any files missing first or second full keys, a file having a first full key and missing a second full key thereby being a file having an inode that has been recovered, but a filename that has not yet been recovered, and a file having the second full key and missing the first full key thereby being a file having a filename that has been recovered, but an inode that has not yet been recovered;

determining from the checking that a particular file is missing one of the first or second full keys;

querying the KVS to find another leaf page in the previous snapshot or other previous snapshots of the namespace that has the missing one of the first or second full keys; and upon finding the missing one of the first or second full keys, associating a value indexed by a now found first or second full key to the particular file, the value thereby being one of the inode or filename of the particular file.

* * * * *